(12) United States Patent
Gebert et al.

(10) Patent No.: US 9,605,718 B2
(45) Date of Patent: Mar. 28, 2017

(54) DEVICE FOR REDUCING PRESSURE PULSATIONS

(75) Inventors: Stefan Gebert, Sonnefeld (DE); Egid Macht, Munich (DE); Paul Marks, Ebern (DE); Robert Mueller, Maroldsweisach (DE); Juergen Ryba, Reckendorf (DE); Jochen Schneier, Zapfendorf (DE); Wilfried Weibelzahl, Grub (DE)

(73) Assignee: FTE automotive GmbH, Ebern (DE)

( * ) Notice: Subject to any disclaimer, the term of this patent is extended or adjusted under 35 U.S.C. 154(b) by 1100 days.

(21) Appl. No.: 13/145,408

(22) PCT Filed: Jan. 22, 2010

(86) PCT No.: PCT/EP2010/000376
§ 371 (c)(1),
(2), (4) Date: Aug. 12, 2011

(87) PCT Pub. No.: WO2010/084008
PCT Pub. Date: Jul. 29, 2010

(65) Prior Publication Data
US 2011/0303315 A1    Dec. 15, 2011

(30) Foreign Application Priority Data

Jan. 22, 2009  (DE) ................. 10 2009 005 830

(51) Int. Cl.
*F16D 48/02*    (2006.01)
*F16D 25/08*    (2006.01)
*F15B 21/00*    (2006.01)

(52) U.S. Cl.
CPC .......... *F16D 25/088* (2013.01); *F15B 21/008* (2013.01); *F16D 2048/0215* (2013.01)

(58) Field of Classification Search
CPC ................................ F15B 21/008; F16L 55/04
(Continued)

(56) References Cited

U.S. PATENT DOCUMENTS 2,357,386 A * 9/1944 Dick ............................... 60/591
2,372,587 A    3/1945 Krueger
(Continued)

FOREIGN PATENT DOCUMENTS

DE    36 31 507 A1    3/1988
DE    40 03 521 A1    8/1991
(Continued)

*Primary Examiner* — F. Daniel Lopez
(74) *Attorney, Agent, or Firm* — Reising Ethington, P.C.

(57) ABSTRACT

The invention relates to a device that is always open for the pressure medium for reducing pressure pulsations and that can be switched between a pressure chamber of a slave cylinder and a pressure chamber of a master cylinder of a hydraulic force transmission system for motor vehicles. The device has an additional line section in the form of a channel having an opening on the slave cylinder side, an opening on the master cylinder side, and a channel length equaling a multiple of the direct distance between the two openings, and a volume receiver that can be elastically deformed under pressure, wherein the channel and the volume receiver are combined into an assembly in a housing. The result according to the invention is a device that not only has very good vibration dampening properties, but is also very compact and has a cost-effective design.

15 Claims, 10 Drawing Sheets

(58) Field of Classification Search
USPC ......... 303/87, 113.1; 138/30, 39, 41–46, 26; 60/591, 469, 592, 533; 192/85.01, 85 C, 192/30 V, 109 F
See application file for complete search history.

(56) References Cited

U.S. PATENT DOCUMENTS

| | | | |
|---|---|---|---|
| 3,964,372 A * | 6/1976 | Chatterjea | 192/109 F |
| 5,320,203 A * | 6/1994 | Wilber et al. | 192/109 F |
| 5,816,046 A | 10/1998 | Paeth et al. | |
| 5,836,235 A | 11/1998 | Rudiger et al. | |
| 6,647,722 B2 | 11/2003 | Schorr et al. | |
| 7,107,768 B2 | 9/2006 | Welter et al. | |
| 7,287,376 B2 | 10/2007 | Macht et al. | |
| 7,578,378 B2 | 8/2009 | Gebert et al. | |
| 2006/0243552 A1* | 11/2006 | Gebert et al. | 192/30 V |

FOREIGN PATENT DOCUMENTS

| | | |
|---|---|---|
| DE | 91 04 919 U1 | 8/1992 |
| DE | 43 22 969 A1 | 1/1995 |
| DE | 100 06 542 A1 | 8/2000 |
| DE | 100 15 051 A1 | 9/2001 |
| FR | 2 738 326 A1 | 3/1997 |
| JP | 59089833 A | 5/1984 |
| JP | 62-39028 U | 3/1987 |

* cited by examiner

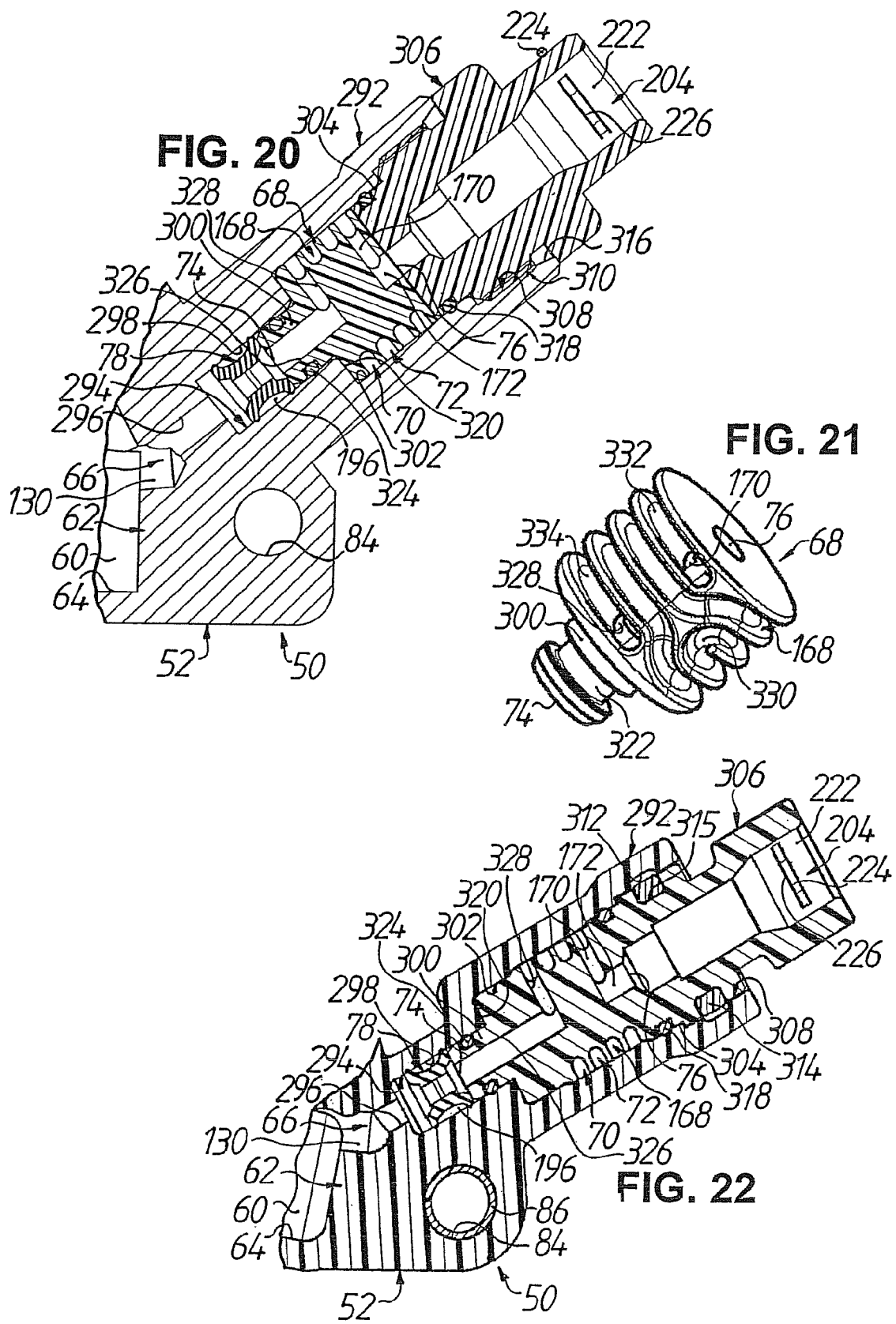

DEVICE FOR REDUCING PRESSURE PULSATIONS

TECHNICAL FIELD

The present invention relates to a device for reducing pressure pulsations, the device being connectible between a pressure chamber of a slave cylinder and a pressure chamber of a master cylinder of a hydraulic force transmission system and being constantly open to the pressure medium. In particular, the invention relates to such devices for reducing pressure pulsations, such as are used on a large scale in hydraulic clutch actuating devices for motor vehicles.

PRIOR ART

FIG. 23 shows a conventional hydraulic clutch actuating device 10 for motor vehicles in a simplified illustration. The hydraulic clutch actuating device 10 comprises a master cylinder 12, which is mounted on a pedal block 11 of the motor vehicle, and a slave cylinder mounted in the motor vehicle in the vicinity of a transmission, the cylinders being hydraulically interconnected by way of a hydraulic line 16 which in this case starts has, seen from the master cylinder 12, a first pipe section 18, a hose section 20 and a second pipe section 22. The piston (not illustrated) of the master cylinder 12 hydraulically connected with a fluid reservoir 24 is operatively connected with a clutch pedal 28 by way of a piston rod 26 so that the master cylinder 12 can be actuated by pressing down the clutch pedal 28, which produces displacement of the piston in the master cylinder 12. In this connection, a fluid column hydraulically loading the slave cylinder 14 is displaced through the hydraulic line 16 in the direction of the slave cylinder 14.

The slave cylinder 14, more precisely the piston (not shown here) thereof, is disposed in operative connection with a release mechanism 36 of a friction clutch 38 by way of a piston rod 30 via a release lever 32 and a release bearing 34. If the slave cylinder 14 is hydraulically loaded for release of the friction clutch 38, then the release mechanism 36 separates a clutch pressure plate 40 from a clutch drive disc 44, which is seated on a transmission shaft 42 and which co-operates with a flywheel 43 carried by the crankshaft of the internal combustion engine (not illustrated), of the friction clutch 38. The internal combustion engine is therefore also separated from the transmission (similarly not shown in more detail) of the motor vehicle.

If the clutch pedal 28 is released in order to re-engage the friction clutch 38, the slave cylinder 14, specifically the piston thereof, is returned to its basic or initial setting as a consequence of, inter alia, the spring forces of the friction clutch 38, in which case the above-mentioned fluid column is displaced through the hydraulic line 16 back again in the direction of the master cylinder 12.

In such a hydraulic clutch actuating in device 10—which is to be regarded as a quasi-static hydraulic force transmission system in which a continuous flow of hydraulic fluid is not present—vibrations of the internal combustion engine, particularly the crankshaft thereof, are transmitted by way of the components of the friction clutch 38, the release bearing 34, the release lever 32 and the slave cylinder 14 to the liquid column, which is present in the hydraulic line 16, between the slave cylinder 14 and the master cylinder 12, the vibrations propagating in the column as pressure pulsations. It was already regarded as disadvantageous that the pressure pulsations are tracked by the driver at the clutch pedal 28 as vibrations particularly when the driver's foot rests on the clutch pedal in typical city driving—so-called "rest tingling"- or the depressed clutch pedal 28 is held, for example during a stop in front of traffic lights.

There is no lack of proposals in the prior art for counteracting this problem, for example DE 36 31 507 C2 "Square helix", DE 40 03 521 C2 "Double line with line branches of different length", U.S. Pat. No. 5,816,046 "Auxiliary oscillator", U.S. Pat. No. 6,647,722 B2 "Diaphragm damper cell", DE 100 06 542 A1 or U.S. Pat. No. 7,107,768 B2 "Damping device with labyrinth body". It is common to these proposals that inserted into or arranged parallel to the hydraulic line between master cylinder and slave cylinder is a separate subassembly, which does not interrupt the fluid column between master cylinder and slave cylinder, for vibration damping, the subassembly being capable in general of also satisfactorily damping the pressure pulsations. However, the previously known solutions partially claim a relatively large amount of installation space, which is not always available in the engine compartment of the motor vehicle to a sufficient extent, and/or give rise to a comparatively complex and accordingly expensive construction of the device, which is not desirable for mass production.

"Double-acting" valve mechanisms connected between master cylinder and slave cylinder (for example, JP 59-89833 A, U.S. Pat. No. 7,578,378 B2) will not be considered in more detail in this connection, which mechanisms open when each displacement of the liquid column occurs, i.e. not only in the case of displacement in the direction of the slave cylinder, but also in the case of a displacement in the direction of the master cylinder, and close when the liquid column is not moving, so as to screen or decouple in terms of vibration the master cylinder from the slave cylinder, since these valve mechanisms (a) are usually of even considerably more complicated construction than damping devices which are constantly "open to the pressure medium" and do not require spring-biased valve bodies or the like, (b) require specific opening and closing pressures which often undesirably increase the return times and the system hysteresis, and finally (c) are provided with bypasses susceptible to contaminations and thus accompanying losses in performance.

What is desired is to provide a device for reducing pressure pulsations, connectible between a pressure chamber of a slave cylinder and a pressure chamber of a master cylinder of a hydraulic force transmission system, particularly a hydraulic clutch actuating device for motor vehicles, and constantly open to the pressure medium, and which device in conjunction with improved vibration-damping characteristics by comparison with the prior art is of compact and economic construction.

SUMMARY OF THE INVENTION

According to the invention a device, which is connectible between a pressure chamber of a slave cylinder and a pressure chamber of a master cylinder of a hydraulic force transmission system, particularly a hydraulic clutch actuating means for motor vehicles, and which is constantly open to the pressure medium, for reducing pressure pulsations comprises, in combination, an additional conduit in the form of a channel having a helix section, defining an opening at the slave cylinder side and an opening at the master cylinder side, and having a channel length which is multiple of the direct spacing between the two openings, and a volume receiver which is resiliently deformable under pressure, the channel and the volume receiver being combined into a subassembly in a housing in such a way that the helix section, which extends in the manner of a screw thread, and the volume receiver are arranged in the housing in a mutually coaxial positional relationship with one substantially surrounding the other.

Investigations have led to the unexpected result that the two afore-described measures for vibration damping—namely an additional conduit in the form of a channel on the one hand and a volume receiver on the other hand—are in combination capable of reducing pressure pulsations to an extent going well beyond the vibration damping effect of the respective measures individually, so that the vibration damping characteristics of the device according to the invention can be categorized as highly effective. Since, in addition, the channel and the volume receiver are combined into a sub-assembly in one and the same housing, wherein in addition the channel length is a multiple of the direct spacing between the two channel openings, the device according to the invention is on the one hand of very compact construction and on the other hand the channel and the volume receiver can be disposed in fluid connection with very little outlay on sealing and connection, thus very economically. A further advantage of the device according to the invention consists in that in the case of use of the device in a hydraulic clutch actuating device according to FIG. 23, which is otherwise conventional, the second pipe section, which is near the slave cylinder, of the hydraulic line which was usually constructed with a cross-section narrowed relative to the first pipe section for the purpose of reduction in vibrations, can be eliminated, i.e. the hose section of the hydraulic line can now be directly connected with the pressure connection of the slave cylinder, in which case the second pipe section according to FIG. 23 can be quasi integrated into the device according to the invention in simple and very space-saving manner. Further, from production aspects it is of advantage that the helix section extends in the manner of a screw thread. Finally, since the helix section and the volume receiver are arranged in the housing in a mutually coaxial positional relationship with one substantially surrounding the other, the device is of particularly short and compact construction. In this connection, the helix section of the channel can surround the volume receiver at least partly coaxially. However, alternatively thereto the volume receiver can also at least partly coaxially surround the helix section of the channel.

It has proved to be particularly effective in terms of damping or reducing vibration if the volume receiver is hydraulically connected upstream of the channel, which forms the additional conduit, as seen in a direction from the slave cylinder to the master cylinder, so that the pressure pulsations propagating from the pressure chamber of the slave cylinder do not have to firstly pass through the additional conduit in order to reach the volume receiver.

In an embodiment of the device according to the invention with particular cost advantages an insert member can be inserted in the housing and bounds, at least partly together with the housing, the channel, which also facilitates assembly of the device.

In this regard, the helix section of the channel can be formed at the outer circumference of the insert member as a groove which is covered radially outwardly by an inner circumferential surface of the housing, which on the one hand can be produced particularly simply and economically—for example, by injection-molding of the insert member, the radially outwardly open groove of which is "completed" in extremely simple manner to form the channel, only on insertion of the insert member into the housing, by the housing wall which is present there in any case, and, in particular, without use of sealing elements or the like—and on the other hand produces a deflection of the fluid column, which has proved advantageous with respect to good vibration damping with smallest possible throughflow resistance. In addition, the helix section can have a helix reversal dividing the helix section into a subsection running in righthanded direction and a subsection running in lefthanded direction, whereby, in particular, the axial installation space requirement for the helix section is reduced.

In a compact embodiment which is particularly simple in terms of production the insert member can be of substantially pot-shaped construction with a casing section and a base. Advantageously, in this regard the helix section, which is formed at the outer circumference of the casing section of the insert member, of the channel can communicate with the opening of the channel at the master cylinder side by way of a connecting section of the channel extending in the base of the insert member.

The volume receiver is preferably mounted at the inner circumference of the sleeve section of the insert member, which on the one hand is required for a compact construction of the device and on the other hand enables a simple plug mounting of the volume receiver. It is in addition preferred if the volume receiver is a rubber-elastic bobbin-shaped element with a passage bore and, at the outer circumferential side, an annular recess which together with the inner circumference of the sleeve section of the insert member bounds an annular air chamber. With such a design of the volume receiver, if a pressure amplitude runs into the passage bore the bobbin-shaped element deforms against the spring effect of the rubber-elastic material, in which case the air volume in the annular air chamber is compressed so that the bobbin-shaped element—as the term "volume receiver" already implies—experiences a defined expansion in the region of the passage bore, which leads to a specific "relieving" of the pressure amplitude. In this connection, the spring effect of the rubber-elastic material and the compressed air volume ensures automatic return of the bobbin-shaped element to its original form when the pressure, which is present in the region of the passage bore of the bobbin-shaped element, of the pressure medium drops below a predetermined value.

In an alternative embodiment of the volume receiver this can moreover be a tubular element of a resilient plastics material which separates a radially inner pressure medium chamber from a radially outer air chamber in the housing. The volume receiver is thus advantageously capable of injection molding, in which case the length and cross-sectional profile can be formed to be relatively simple. In this embodiment of the volume receiver, if a pressure amplitude runs into the inner pressure medium chamber the tubular element slightly deforms against the spring effect of the plastics material, whereby the air volume in the radially outer air chamber is compressed so that the tubular element experiences a predetermined expansion which in turn leads to "relieving" of the pressure amplitude. In that case, the spring effect of the plastics material and—to a far smaller extent—the compressed air volume in the radially outer air chamber ensure automatic return of the tubular element to its original form when the pressure, which is present in the inner pressure medium chamber, of the pressure medium drops below a defined value. In this alternative of the device the substantially pin-shaped insert member can advantageously be inserted into a central bore, which communicates with the pressure medium chamber, in the housing.

Alternatively thereto, the volume receiver can be a substantially hose-shaped element of a rubber-elastic material which bounds a radially inner pressure medium chamber in the housing and bears by its outer circumferential surface against an inner circumferential surface of the housing, in which case the outer circumferential surface of the volume receiver is provided with a profiling for formation of cavities between the volume receiver and housing. Thus, in particular, the volume take-up of the system can advantageously be limited in defined manner.

However, as a further alternative for the volume receiver an embodiment is also conceivable in which there is formed in the housing or insert member a smaller cylinder space in which a spring-biased small piston is accommodated to be longitudinally displaceable in such a manner that in the case of a pressure amplitude the piston is displaced against its spring bias and through the thus-produced volume take-up a "relieving" of the pressure amplitude is again produced. The automatic return of the piston when a predetermined pressure of the pressure medium is fallen below would, in the case of such an embodiment, be produced by the spring operatively connected with the piston, for example a metallic helical compression spring, the characteristic and bias of which could in a given case also be settable in correspondence with the respective constructional conditions or requirements, but in each instance would be clearly defined and in addition advantageously substantially independent of the ambient temperature.

In one possible variant of the device it is provided that the housing is a separate housing which, provided with a slave connection and a master connection, is connectible into a hydraulic line between slave cylinder and master cylinder so that the slave connection and the master connection communicate with the pressure medium chamber formed in the interior space of the housing. This variant enables a substantially free placing, or a placing adapted to the respective constructional requirements or preconditions, of the device in the hydraulic line between slave cylinder and master cylinder. In this regard, the separate housing preferably has two parts, which, when fastened to one another, bound the interior space in which the insert member and the volume receiver are arranged. However, an embodiment is also conceivable in which the insert member and/or—in the case of the tubular element—the volume receiver is or are formed integrally with one of the housing halves so as to further reduce the parts count. The volume receiver preferably separates the pressure medium chamber from an air chamber in the interior space of the separate housing. The insert member is preferably axially clamped in place between the two parts of the separate housing so that there is no need for additional measures for fastening of the insert member. In analogous manner the tubular or hose-shaped element can also be clamped in place between the two parts of the separate housing.

In another variant of the device the housing is a cylinder housing of the slave cylinder (more preferred) or the master cylinder (less preferred), which has a pressure connection. Through arrangement of the device in the cylinder housing, particularly in the pressure chamber of the slave cylinder—where for this purpose no additional installation space has to be provided, since the cylinder dead space present here in any case can be utilized, so that the axial constructional length of the slave cylinder compared with conventional constructions does not change—the integration of the vibration-damping measures in the hydraulic force transmission system is similarly undertaken in very space-saving manner, wherein in a given case even an existing slave cylinder such as known from, for example, U.S. Pat. No. 7,287,376 B2 of the applicant can be adopted unchanged for integration of the device according to the invention. Through the arrangement of the device according to the invention in the pressure chamber of the slave cylinder, i.e. in the immediate vicinity of the location of the introduction of vibrations into the liquid column, it is in addition advantageously ensured that the pressure pulsations cannot propagate at maximum amplitude in or through the hydraulic line between slave cylinder and master cylinder, so that there is also minimization of the risk that the hydraulic line due to vibration detaches from its fastening points at, for example, the bodywork of a motor vehicle or shakes loose at these.

In an alternative, which is particularly favorable in terms of maintenance, to the arrangement of the device in the pressure chamber of the cylinder housing, the channel and volume receiver of the device can be contained in a pressure connecting section of the cylinder housing. In an advantageous embodiment the insert member is then inserted into the pressure connecting section and held there by connecting member. With respect to, in particular, simple mounting and capability of exchange it is in that regard advantageous if the insert member and the connecting member are constructed integrally.

With respect to a best possible damping effect it has also proved advantageous if the helix section of the channel has a cross-section which is smaller than or equal to the minimum cross-section of the slave and/or master connection of the separate housing or of the pressure connection of the cylinder housing, whereby a specific throttling effect is also provided.

In principle, the insert member and/or the housing of the device can be made of a metallic material, for example an aluminum alloy, such as by machining. However, is beneficial particularly for creation of an economic device if the insert member and preferably also the housing are injection-molded, as already mentioned, from a plastics material.

In a further variant of the device, finally, an additional path section can branch off the channel and open into a closed chamber in order to further influence the damping characteristics. In this regard, the afore-mentioned volume receiver or an additional volume receiver can be accommodated in the closed chamber.

BRIEF DESCRIPTION OF THE DRAWINGS

The invention is explained in more detail in the following on the basis of preferred exemplifying embodiments with reference to the accompanying, partly schematic drawings, in which the same reference numerals denote the same or corresponding parts and elastomeric parts are, for simplification of illustration, mostly shown in undeformed state and in which:

FIG. 20 shows a broken-away longitudinal sectional view of a slave cylinder for a hydraulic clutch actuating means for motor vehicles, in the pressure connecting section of which a volume receiver and an insert member with an additional duct in the form of a channel are inserted, which in combination form a device—which is always open to the pressure medium—for reducing pressure pulsations and which are held in the pressure connecting section by a connecting member, similar to of the first embodiment according to the invention, FIG. 21 shows a perspective individual illustration, obliquely from the front, of the insert member inserted into the pressure connecting section in the case of the slave cylinder according to FIG. 20, FIG. 22 shows a broken-away longitudinal sectional view of a slave cylinder for a hydraulic clutch actuating means for motor vehicles, in which—similarly to FIG. 20—the device, which consists of volume receiver and an additional conduit in the form of a channel, for reducing pressure pulsations is accommodated in the pressure connecting section, wherein by contrast to FIG. 20 the insert member and connecting member are constructed integrally, again similar to the first embodiment according to the invention.

DETAILED DESCRIPTION OF THE EMBODIMENTS

Figure 1:
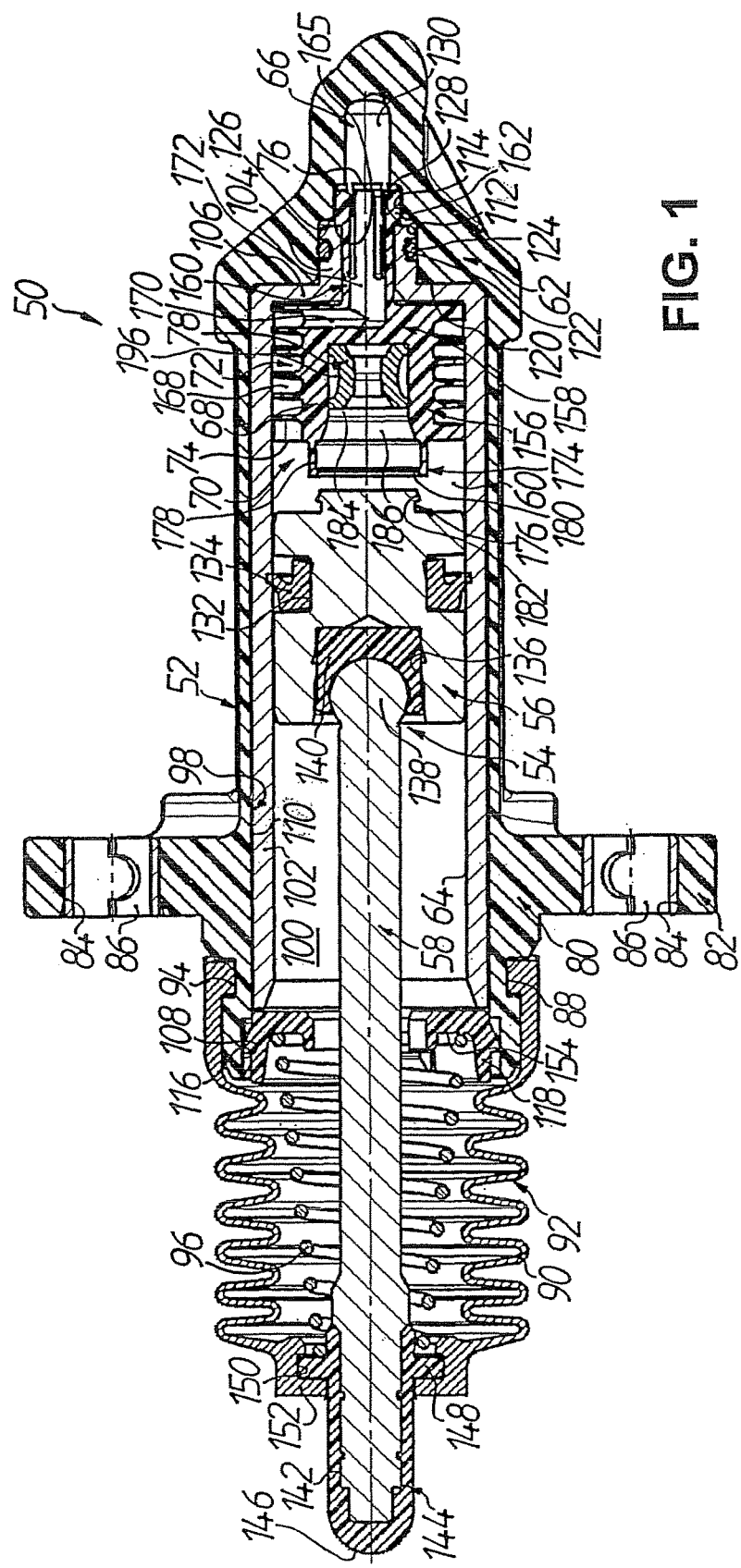
FIG. 1 shows a longitudinal sectional view of a slave cylinder for a hydraulic clutch actuating device for motor vehicles, into the pressure chamber of which is inserted an insert member equipped with a device for reducing pressure pulsations, the device being constantly open to the pressure medium and comprising in combination an additional conduit in the form of a channel and a volume receiver, as a first embodiment of the device according to the invention.
Figure 2:
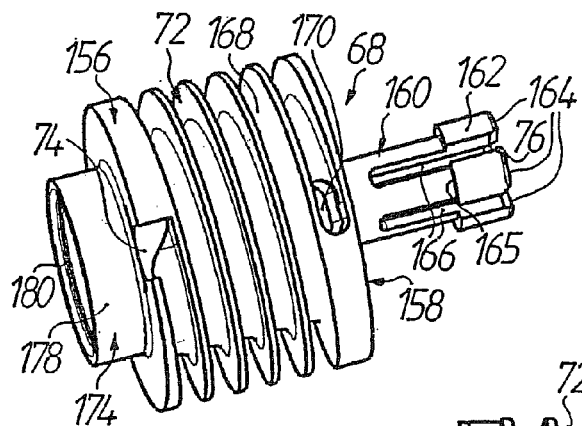
FIG. 2 shows a perspective individual illustration, obliquely from the front, of the pot-shaped insert member fastened, in the case of the slave cylinder according to FIG. 1, in the pressure connection.
Figure 3:
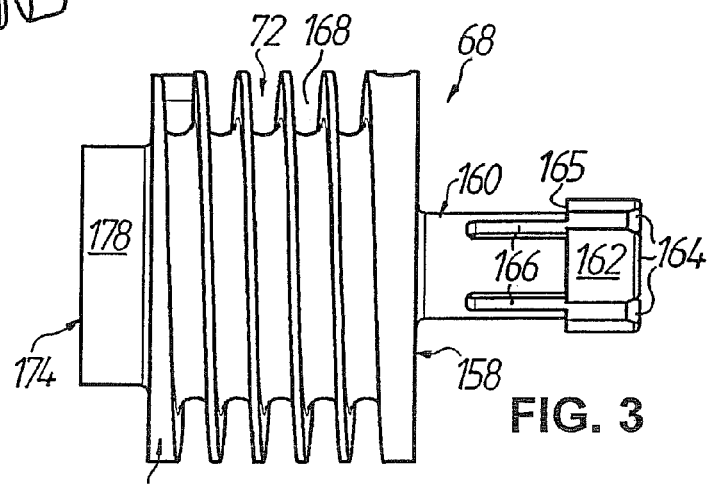
FIG. 3 shows a side view of the insert member according to FIG. 2.
Figure 4:
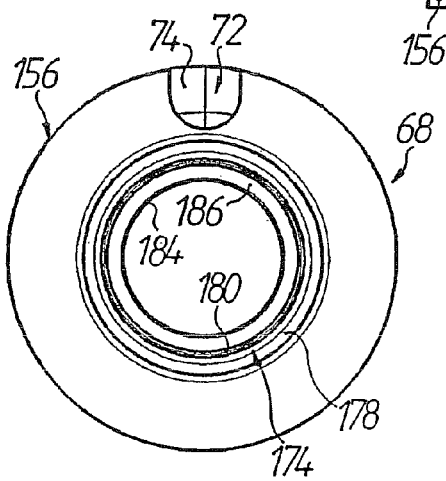
FIG. 4 shows a front view of the insert member according to FIG. 2, from the left in FIG. 3.
Figure 5:
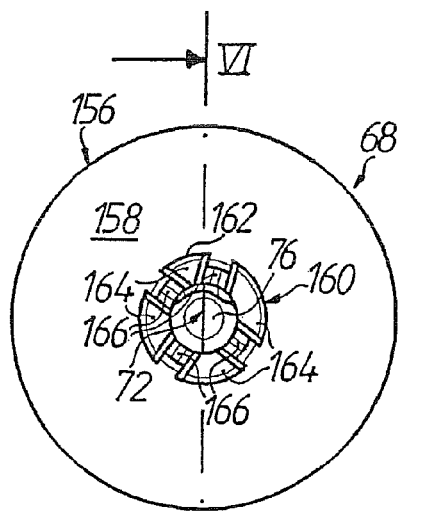
FIG. 5 shows a back view of the insert member according to FIG. 2, from the right in FIG. 3.
Figure 23:
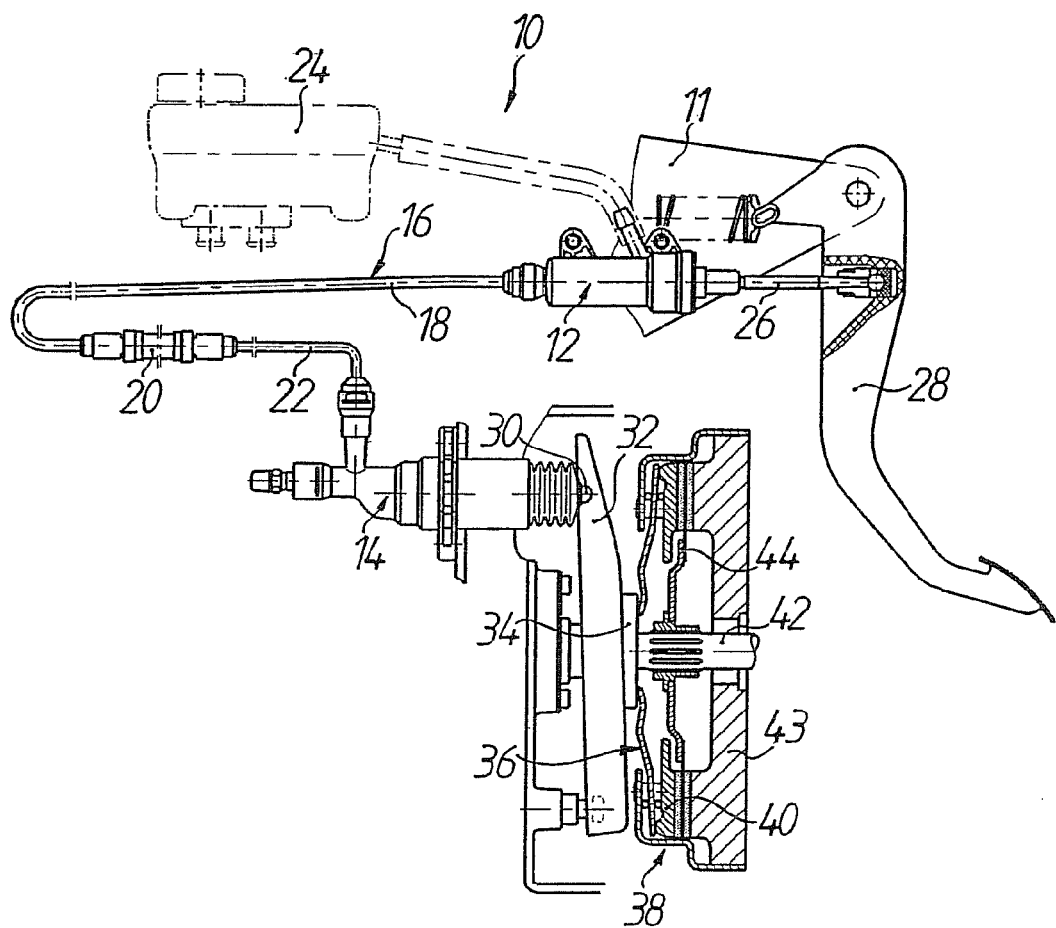
FIG. 23 shows a basic illustration of a hydraulic clutch actuating means according to the prior art.

FIG. 1 shows a slave cylinder 50 for a vibration-damped hydraulic force transmission system, namely a vibration-damped hydraulic clutch actuating device for motor vehicles. The slave cylinder 50 has a cylinder housing which is denoted in general by 52 and in which a piston subassembly 54 is received to be longitudinally displaceable, the subassembly comprising a piston 56 and a piston rod 58 which is connected at least tension-resistantly and compression-resistantly, thus effective in terms of actuation, with the piston 56. Disposed in the cylinder housing 52 is a pressure chamber 60 which is variably bounded on the side on the left in FIG. 1 by the piston 56, fixedly bounded on the side on the right in FIG. 1 by a housing base 62 of the cylinder housing 52 and fixedly bounded radially outwardly by a circumferential wall 64 of the cylinder housing 52. The pressure chamber 60 is selectably loadable by way of a pressure connection 66—which is provided at the housing base 62 and which in the mounted state of the slave cylinder 50 is connected in a manner known per se (cf. FIG. 23) by way of a pressure line (which by comparison with FIG. 23 can also be of different construction) with a clutch master cylinder—by a pressure medium, for example brake fluid, in order to displace the piston 56 in the cylinder housing 52. As will be described in more detail in the following, inserted into the pressure chamber 60 adjoining the housing base 62 is an insert member 68 which is secured in the pressure connection 66 and in the first exemplifying embodiment illustrated here advantageously fulfils a plurality of functions. In this regard, the insert member 68 serves, in particular, as a support for a device 70, which is constantly open to the pressure medium, for reducing pressure pulsations or is equipped with this.

As is similarly explained in detail further below, the device 70, which in the mounted state of the slave cylinder 50 is therefore connected between the pressure chamber 60 of the slave cylinder 50 and a pressure chamber of the master cylinder (cf. again FIG. 23) for reducing pressure pulsations comprises on the one hand an additional conduit in the form of a channel 72, which has an opening 74 at the pressure chamber side or slave cylinder side, an opening 76 at the pressure connection side or master cylinder side and therebetween a channel length amounting to a multiple of the direct spacing, i.e. the "straight line spacing", between the two openings 74, 76, and on the other hand a volume receiver 78 which is mounted at the insert member 68 and which is resiliently deformable under pressure. As a result, the channel 72 and the volume receiver 78 of the device 70 for reducing pressure pulsations are combined in the cylinder housing 52 with the highest degree of compactness to form a subassembly, in which case the insert member 68 at least partly together with the cylinder housing 52 bounds the channel 72.

According to FIG. 1 the cylinder housing 52 comprises a base body 80, which is preferably injection-molded from plastics material and which is provided at the outer circumferential side with a fastening flange 82 for mounting the slave cylinder 50 in the motor vehicle. The fastening flange 82 has two fastening bores 84, which are reinforced by slotted steel bushes 86. Extending through the fastening bores 84 lined by the steel bushes 86 are, in the mounted state of the slave cylinder 50, for example, screws (not shown) which serve for fastening the slave cylinder 50 to, for example, a transmission wall (not illustrated) in the motor vehicle. In FIG. 1 on the left of the fastening flange 82 the base body 80 of the cylinder housing 52 moreover has at the outer circumferential side a radial groove 88 into which an elastomeric protective cap 92, which has a bellows section 90 surrounding the piston rod 58, is clipped by an annular collar 94 at the inner circumferential side. The bellows section 90 of the protective cap 92 additionally encloses a spring element in the form of a helical compression spring 96, which is provided on the side of the piston 56 remote from the pressure chamber 60 and which is supported at its end on the right in FIG. 1 at the cylinder housing 52 and engages at its end at the left in FIG. 1 the piston rod 58, so that the helical compression spring 96 biases the piston subassembly 54 in a direction away from the housing base 62 so as to keep the piston rod 58 in contact with a clutch lever (not shown) in the mounted state of the slave cylinder.

At the inner circumferential side the base body 80 of the cylinder housing 52 has a stepped bore 98 which is open towards the left in FIG. 1 and into which a preferably metallic guide sleeve 100 as a further component of the cylinder housing 52 is inserted. The guide sleeve 100 has two hollow-cylindrical sleeve sections 102, 104 of different diameter which are connected together at the housing base 62 of the cylinder housing 52 by way of an annular section 106. Starting from the side at the left in FIG. 1 the stepped bore 98 of the base body 80 now has four bore sections 108, 110, 112 and 114 which are of different diameter reducing in FIG. 1 from the left to the right.

The first bore section 108 of the stepped bore 98 in the base body 80 has at its open end an undercut 116 which serves for the fixing at the cylinder housing 52 of an annular securing element 118 preferably of plastics material, which is slotted for mounting and which bears against the end face of the guide sleeve 100 at the left in FIG. 1 and thus secures the guide sleeve 100 in the base body 80 of the cylinder housing 52. The larger-diameter sleeve section 102 of the guide sleeve 100 is tightly received in the second bore section 110 of the stepped bore 98 of the base body 80 and forms by its inner circumferential surface the circumferential wall 64 bounding the pressure chamber 60. The third bore section 112 of the stepped bore 98 is connected with the second bore section 110 by way of an annular shoulder 120 against which the annular section 116 of the guide sleeve 100 bears. The smaller-diameter sleeve section 104 of the guide sleeve 100 is tightly received in the third bore section 112 of the stepped bore 98 in the base body 80. In that case the sleeve section 104 is provided at the outer circumferential side with a radial groove 122 for reception of an O-ring 124, which ensures static sealing between the third bore section 112 with the base body 80 and the sleeve section 104 of the guide sleeve 100. The fourth bore section 114 of the base body 80 is connected with the third bore section 112 by way of a further annular shoulder 126. The dimensions of the smaller diameter sleeve section 104 of the guide sleeve 100 on the one hand and the third and fourth bore sections 112, 114 of the stepped bore 98 on the other hand are so matched to one another that an annular end surface 128 of the sleeve section 104 of the guide sleeve 100 has a small axial spacing from the annular shoulder 126 of the base body 80 and protrudes radially inwardly beyond shoulder 126 for fastening, which will be described in more detail, of the insert member 68 in the pressure connection 66. The fourth bore section 114 of the stepped bore 98 in the base body 80 is additionally provided at the inner circumferential side with a plurality—here for example four—of longitudinal ribs (not able to be seen in FIG. 1) which extend in axial direction of the cylinder housing 52 and which protrude radially inwardly and are non-uniformly or asymmetrically distributed over the circumference of the fourth bore section 114. The ribs serve for rotational angle orientation of the insert member 68 in the pressure connection 66 as will be similarly explained in more detail in the following. Finally, a smaller-diameter pressure connection bore 130, which is formed in the base body 80, in the fourth bore section 114 opens at the end, which is at the right in FIG. 1, of the fourth bore section 114 of the stepped bore 98.

It is evident from the above description that the pressure connection bore 130, the fourth bore section 114 of the stepped bore 98 and the sleeve section 104, which is received in the third bore section 112 thereof, of the guide sleeve 100 are a component of the pressure connection 66, by way of which the pressure chamber 60 of the slave cylinder 50 can be loaded with the pressure medium. As a consequence of the static sealing, which is produced by the O-ring 124, at the outer circumference of the smaller-diameter sleeve section 104 of the guide sleeve 100 this experiences, in the case of a pressure loading of the pressure chamber 60 by way of the pressure connection 66 in which the hydraulic pressure on the one hand acts on the annular end surface 128 of the sleeve section 104 and on the other hand on the larger-area end surface—which is opposite thereto and faces the pressure chamber 60—of the annular section 106 of the guide sleeve 100, a resulting force to the right in FIG. 1 which endeavors to keep the guide sleeve 100 in the stepped bore 98 of the base body 80, thus relieves of load the fastening of the guide sleeve 100 in the base body 80 by the securing element 118.

As can be further inferred from FIG. 1, the piston 56, which is guided with a small radial play in the larger-diameter sleeve section 102 of the guide sleeve 100 of the cylinder housing 52 and in the illustrated embodiment is metallic, has at the outer circumference a radial groove 132 for reception of a groove ring 134. The elastomeric groove ring 134 bears, in a manner known per se, by its outer circumferential sealing lip under a defined bias against the circumferential wall 64 of the cylinder housing 52 and thus ensures dynamic sealing of the pressure chamber 60 towards the left in FIG. 1.

The piston 56 is additionally provided on the side at the left in FIG. 1 with a central recess 136 in which a ball head 138, which is formed at the end of the piston rod 58 at the right in FIG. 1, is pivotably retained by a securing element 140 so that the piston rod 58 has a defined capability of angular movement with respect to the piston 56. Instead of the form of the piston subassembly 54 shown in FIG. 1 this could also be of integral construction with a piston outer surface, which decreases conically or spherically towards the piston rod, for ensuring the capability of angular movement, as is known in principle from DE 43 22 969 A1 or DE 43 31 241 A1.

The piston rod 58 which is metallic in the illustrated embodiment has on the side at the left in FIG. 1 a profiled end 142 onto which an end member 144 of plastics material is injection-molded, the end member having a substantially spherical end surface 146 by way of which the piston rod 58 engages the clutch lever (not shown) to be effective in terms of actuation. At the end of the end member 144 at the right in FIG. 1 this forms an annular collar 148 of the piston rod 58 which serves on the one hand for coupling the protective cap 92 to the piston rod 58, wherein the annular collar 148 is mechanically positively engaged in an annular recess 150 of substantially complementary form in a fastening section 152 of the protective cap 92, which is connected on the side of the protective cap 92 remote from the pressure chamber 60 with the bellows section 90 of the protective cap 92. On the other hand, the annular collar 148 of the piston rod 58 forms by its end face towards the pressure chamber 60 a counter-bearing for the helical compression spring 96, wherein a defined radial centering effect, which is of advantage when mounting the slave cylinder 50 in the motor vehicle, also derives from the end of the biased helical compression spring 96 facing the annular collar 148.

It is additionally evident from FIG. 1 that the securing element 118 for retaining the guide sleeve 100 in the cylinder housing 52 is provided on its side remote from the pressure chamber 60 with an axial groove 154 which serves as a further counter-bearing and for centering of the end, which faces the pressure chamber 60 and is at the right in FIG. 1, of the helical compression spring 96, which starting from the annular collar 148 of the piston rod 58 substantially conically widens in diameter towards the axial groove 154, thus is of frusto-conical construction. Through this "outward redisposition" of the helical compression spring from the pressure chamber 60 and the guide sleeve 100 to the illustrated setting between securing element 118 and annular collar 148 at the piston rod 58 it is possible to advantageously reduce by comparison with previously known constructions the ratio of stroke volume to dead-space volume—or actual volume in the illustrated (installed) basic setting of the piston rod 56—of the pressure chamber 60, which ultimately produces a very short axial constructional length of the actual cylinder housing 52. Moreover, since the pressure chamber 60 does not have to receive a piston restoring spring at which air bubbles could 'settle', the pressure chamber 60 on return of the piston rod 56 from an actuating setting to a basic setting thereof is effectively flushed or evacuated by the pressure medium, which contributes to very good ventilation of the slave cylinder 50.

Further details of the device 70 for reducing pressure pulsations are evident from FIGS. 2 to 9, in particular with respect to the insert member 68 (FIGS. 2 to 7) injection-molded from a suitable plastics material, for example from a glass-fiber-reinforced polyamide 66, and the elastomeric volume receiver 78 (FIGS. 8 and 9) contained therein.

Figure 6:
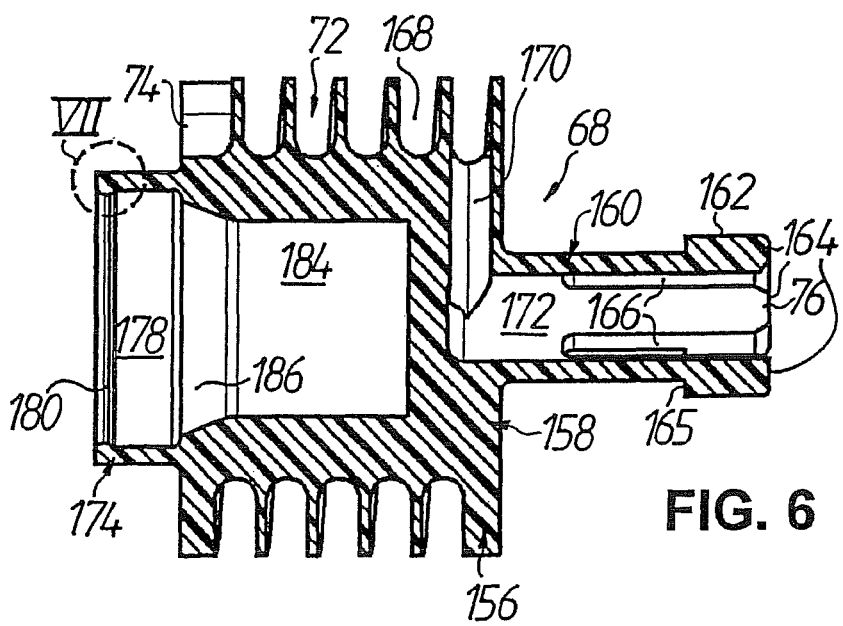
FIG. 6 shows a sectional view of the insert member according to FIG. 2 in correspondence with the section line VI-VI in FIG. 5.

According to, in particular, FIGS. 1 and 6, the insert member 68 is of substantially pot-shaped construction, with a casing section 156, the outer diameter of which substantially corresponds with the inner diameter of the circumferential wall 64 of the cylinder housing 52, and a base 158 with which a substantially hollow-cylindrical projection 160 is connected, the projection being inserted into the pressure connection 66 of the cylinder housing 52.

More precisely, the insert member 68 is axially mechanically positively fastened in the pressure connection 66 of the cylinder housing 52, namely by a snap connection. For this purpose the projection 160 of the insert member 68 is provided, going out from its free end at the outer circumference, with a segmented annular collar 162 and has multiple longitudinal slotting for formation of a plurality of spring arms 164 (see, in particular, FIGS. 2, 3, 5 and 6), wherein a counter-bearing surface 165, which is foimed by the annular collar 162 of the projection 160 and faces towards the pressure chamber 60, according to FIG. 1 engages in the pressure connection 66 of the cylinder housing 52 in the manner of a snap hook behind the annular end surface 128, which protrudes radially inwardly into the base body 80 beyond the fourth bore section 114 of the stepped bore 98 and is formed by the smaller-diameter sleeve section 104 of the guide sleeve 100. According to, in particular, FIG. 5, there are four slots 166, which extend in longitudinal direction of the projection 160 and which in the illustrated embodiment interrupt the projection 160 of the insert member 68 and the asymmetrical distribution of which over the circumference of the projection 160 corresponds with the distribution of the above-mentioned longitudinal ribs (not shown) in the fourth bore section 114 of the stepped bore 98 in the base body 80 of the cylinder housing 52. In this regard, the slots 166 in the projection 160 of the insert member 68 on the one hand and the longitudinal ribs in the base body 80 of the cylinder housing 52 on the other hand are so matched to one another in terms of dimensions that in the mounted state of the insert member 68 the longitudinal ribs at the housing side engage with a small circumferential play in the slots 166, but in that case do not protrude radially inwardly beyond the spring arms 164. The asymmetrical, mutually matched circumferential distribution of the longitudinal ribs and slots 166 ensures in simple manner a unique rotational angle orientation of the mounted insert member 68 in the slave cylinder 50, in particular in such a manner that the opening 74, which is at the pressure chamber side, of the channel 72 of the device 70 for reducing pressure pulsations is, in the installed position of the slave cylinder 50, disposed at the top near the inner circumferential surface of the cylinder housing 52 formed by the circumferential wall 64, as shown in FIG. 1.

For preferably automatic production of the afore-described snap connection between the cylinder housing 52 and the insert member 68, which is oriented in terms of angle with respect to the cylinder housing 52, the insert member is pushed, starting from the open end of the cylinder housing 52 lined with the guide sleeve 100, into the guide sleeve 100 until the spring arms 164 of the projection 160 come into contact with a small chamfer between the annular section 106 and the inner circumference of the smaller-diameter sleeve section 104 of the guide sleeve 100. On further axial relative displacement of the insert member 68 with respect to the cylinder housing 52 the spring arms 164 spring radially inwardly. As a consequence, the longitudinal ribs (not shown) in the fourth bore section 114 of the base body 80 of the cylinder housing 52 enter the slots 166 of the projection 160 of the insert member 68 before the spring arms spring radially outwardly again and detent by their segmented counter-bearing surface 165 behind the annular end surface 128 of the sleeve section 104. At substantially the same time the base 158 of the insert member 168 comes into contact by its end face towards the pressure connection 66 with the end surface, which faces the pressure chamber 60, of the annular section 106 of the guide sleeve 100. Since not only the transition from the end surface, which faces the pressure connection 56, of the spring arms 164 to the outer circumferential surface thereof, but also the transition of the end surface, which faces the pressure chamber 60, of the longitudinal ribs (not illustrated) to the inner circumferential surface thereof is formed to be right-angular only with a broken edge, i.e. without a chamfer, the insert member 68 can be joined to the cylinder housing 52 only in the case of correct angular orientation of these parts relative to one another. In the event of an attempt to join the insert member 68 without angular orientation or with incorrect angular orientation to the cylinder housing 52 the mutually facing end surfaces at the spring arms 164 on the one hand and at the longitudinal ribs (not shown) on the other hand hit one another substantially by an area and thus prevent further axial displacement of the insert member 68 with respect to the cylinder housing 52. Since, moreover, the angular orientation of the insert member 68 with respect to the cylinder housing 52 takes place at the base body 80 thereof, a fixing, which acts in circumferential direction, of the guide sleeve 100 in the base body 80 is not necessary.

As evident particularly from FIGS. 1 and 6, the channel 72 in the insert member 68 has a helically extending helix section 168, which is connected by way of a connecting section 170, which extends in radial direction in the base 158 of the insert member 68, with an end section 172 formed by the projection 160 of the insert member 68 and extending in radial direction, so that the helix section 168 communicates not only with the opening 74 at the slave cylinder side, but also with the opening 76 at the master cylinder side, of the channel 72. In that case the helix section 168 of the channel 72 is formed at the outer circumference of the casing section 156 of the insert member 68, preferably by injection molding, as a groove which in the mounted state of the insert member 68 is covered radially outwardly by the inner circumferential surface of the cylinder housing 52 formed by the circumferential wall 64. In the illustrated embodiment, the helix section 168 has five complete turns; however, it will be evident that the helix section can have also more or less turns in correspondence with the respective functional requirements, which—just as other cross-sectional shapes of the helix section departing from the illustrated substantially rectangular cross-sectional shape—can be easily managed by injection molding. The cross-section or the cross-sectional area of the helix section 168 of the channel 72 is preferably to be selected so that it is smaller than or equal to the minimum cross-section of the pressure connection 66, which in the illustrated embodiment is defined by the pressure connecting bore 130.

Figure 7:
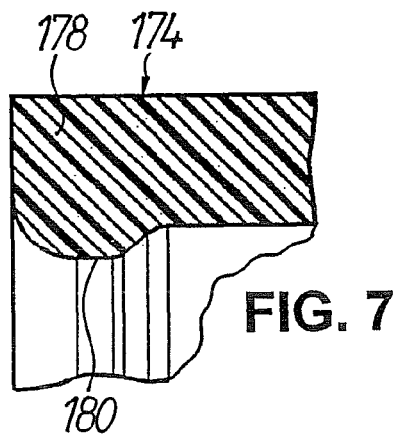
FIG. 7 shows an illustration, to enlarged scale, of the detail VII in FIG. 6.

According to, in particular, FIGS. 1, 6 and 7 the insert member 68 additionally has at its end at the pressure chamber side a captive section 174 which co-operates with a projection 176 of the piston 56 at the pressure chamber side in such a manner that the piston 56 prior to pressure-medium filling or first actuation of the slave cylinder 50 is fixed in a predetermined stroke setting with respect to the cylinder housing 52 and is releasable relative to the cylinder housing 52 by the pressure-medium filling or first actuation of the slave cylinder 50. More precisely, the captive section 174 of the insert member 68 comprises a hollow cylinder 178, which is connected at the left in FIG. 1 with the casing section 156 of the member and is axially aligned with respect to a center axis of the pressure chamber 60, with a radially inwardly projecting annular bead 180 which extends at the inner circumferential side and which is shown in FIG. 7 to enlarged scale, while the central projection 176 at the piston 56 is provided at the outer circumferential side with an annular collar 182 (see FIG. 1) which has an outer surface slightly tapering in direction towards the pressure connection 66 and mechanically positively engages behind the annular bead 180 in the fixed state of the piston 56 at the insert member 68. For this purpose, the annular bead 180, which according to, in particular, FIG. 7 is radiused towards the pressure chamber 60, on the one hand and the annular collar 182 on the other hand are so matched to one another in terms of dimensions that the clear inner diameter of the annular bead 180 is slightly smaller than the largest outer diameter of the annular collar 182, whilst the spacing thereof from the end surface of the piston 56 is slightly larger than the axial length of the annular bead 180.

For rendering the piston subassembly 54 captive at the insert member 68 when the slave cylinder 50 is assembled the piston subassembly 54 is pushed against the force of the helical compression spring 96 into the cylinder housing 58 in the sense of reduction of the pressure chamber 60 until the projection 176 at the piston 56 comes into contact by its annular collar 182, which is chamfered towards the insert member 68, with the radiused annular bead 180 facing the pressure chamber 60. On further axial relative displacement of the piston subassembly 54 with respect to the cylinder housing 52 in the direction of the pressure connection 68 the annular collar 182 at the piston projection 176 resiliently widens the annular bead 180 of the captive section 174 in radially outward direction. After pressing beyond the annular bead 180 this snaps behind the annular collar 182 as a consequence of the resilient characteristics of the material of the insert member 68, thus into the annular gap between the annular collar 182 and the end surface of the piston 56 facing the pressure chamber 60. The piston subassembly 54 is now mechanically positively fixed to the captive section 174 of the insert member 68.

Since the piston subassembly 54 is thus captive in a setting in which it is pushed as far as possible into the cylinder housing 52, the slave cylinder 50 requires only a small amount of space for storage, transport and mounting in the motor vehicle. Moreover, the slave cylinder 50 can be mounted substantially free of force in the motor vehicle, because the helical compression spring 96 does not have to be compressed, but is kept in a biased setting by means of the capture of the piston subassembly 54 produced by the insert member 68.

For the first actuation of the slave cylinder 50 mounted in the motor vehicle the pressure medium is fed to the pressure chamber 60 by way of the pressure connection 66. As a consequence of the pressure which thereby builds up in the pressure chamber 60 and acts on the effective area of the piston 56, the piston 56 experiences a force which is directed to the left in FIG. 1 and which adds to the force of the helical compression spring 96. If the sum of these forces exceeds the holding force of the connection between the projection 176 of the piston 56 and the captive section 174 of the insert member 68 the annular bead 180 at the captive section 174 is further expanded beyond the annular collar 182 at the projection 176, whereupon the piston subassembly 54 is released from the insert member 68. Further capturing of the piston subassembly 54 in operation of the slave cylinder 50 is not intended and also cannot take place, since the axial spacing, which is shown in FIG. 1, between the projection 176 of the piston 56 and the captive section 174 at the insert member 68 is, in operation of the slave cylinder 50, always maintained.

It is apparent from the above description that the holding force of the connection between the projection 176 of the piston 56 and the captive section 174 of the insert member 68 is constructionally designed in such a manner that it is on the one hand sufficiently larger than the spring force of the helical compression spring 96 so as to prevent unintended release of the captivation of the piston subassembly 54, but on the other hand sufficiently smaller than the holding force of the connection between the insert member 68 and the cylinder housing 52 so that the insert member 68 on first actuation of the slave cylinder 50 is not pulled out of the pressure connection 66.

As is further evident from FIG. 1, the volume receiver 78 is mounted at the inner circumference of the casing section 156 of the insert member 68 so that the helix section 168 of the channel 72 coaxially surrounds the volume receiver 78. For this purpose the insert member 68 has a cylindrical blind bore 184 with which at the left in FIGS. 1 and 6 a conically widening joining section 186 for the volume receiver 78, which ends with a small step at the hollow cylinder 178, is connected.

Figure 8:
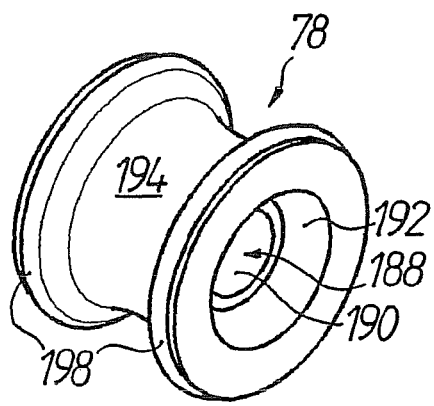
FIG. 8 shows a perspective individual illustration, obliquely from the front, of the elastomeric volume receiver mounted at the insert member in the case of the slave cylinder as shown in FIG. 1.
Figure 9:
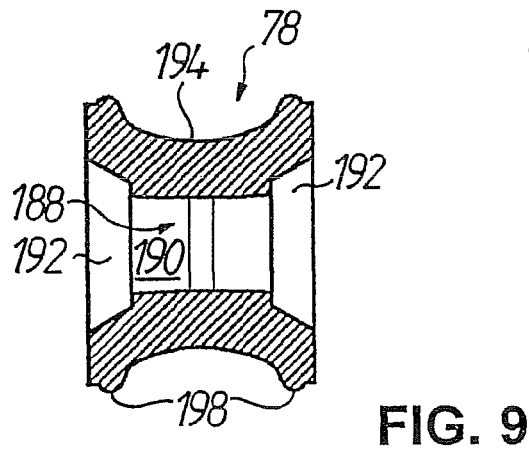
FIG. 9 shows a longitudinal sectional view of the volume receiver according to FIG. 8.

The volume receiver 78 shown in more detail in FIGS. 8 and 9 is a rubber-elastic substantially bobbin-shaped element which has a passage bore 188 with a central cylinder section 190 and opening funnels 192 disposed on either side of the cylinder section 190. At the outer circumferential side the volume receiver 78, which is rotationally symmetrical with respect to its longitudinal axis and which is formed with mirror symmetry with respect to a notional plane perpendicular to the longitudinal axis, is provided with a channel-shaped annular recess 194 which according to FIG. 1 bounds, in the region of the blind bore 184 and together with the inner circumference of the casing section 156 of the insert member 68, an annular air chamber 196. The air chamber 196 is sealed at both sides, i.e. to the right and left in FIG. 1, by annular sealing beads 198 (see FIGS. 8 and 9) of the volume receiver 78. The function of this volume receiver 78 was already explained in more detail in the introduction, so that further explanations with respect thereto at this point appear redundant. In this connection it is finally still to be mentioned that the illustrated arrangement or positioning of channel 72 and volume receiver 78, in which the volume receiver 78 is upstream in hydraulic terms of the channel 72—which forms the additional conduit—as seen from the pressure chamber 60, has proved particularly effective in terms of damping vibrations.

Figure 10:
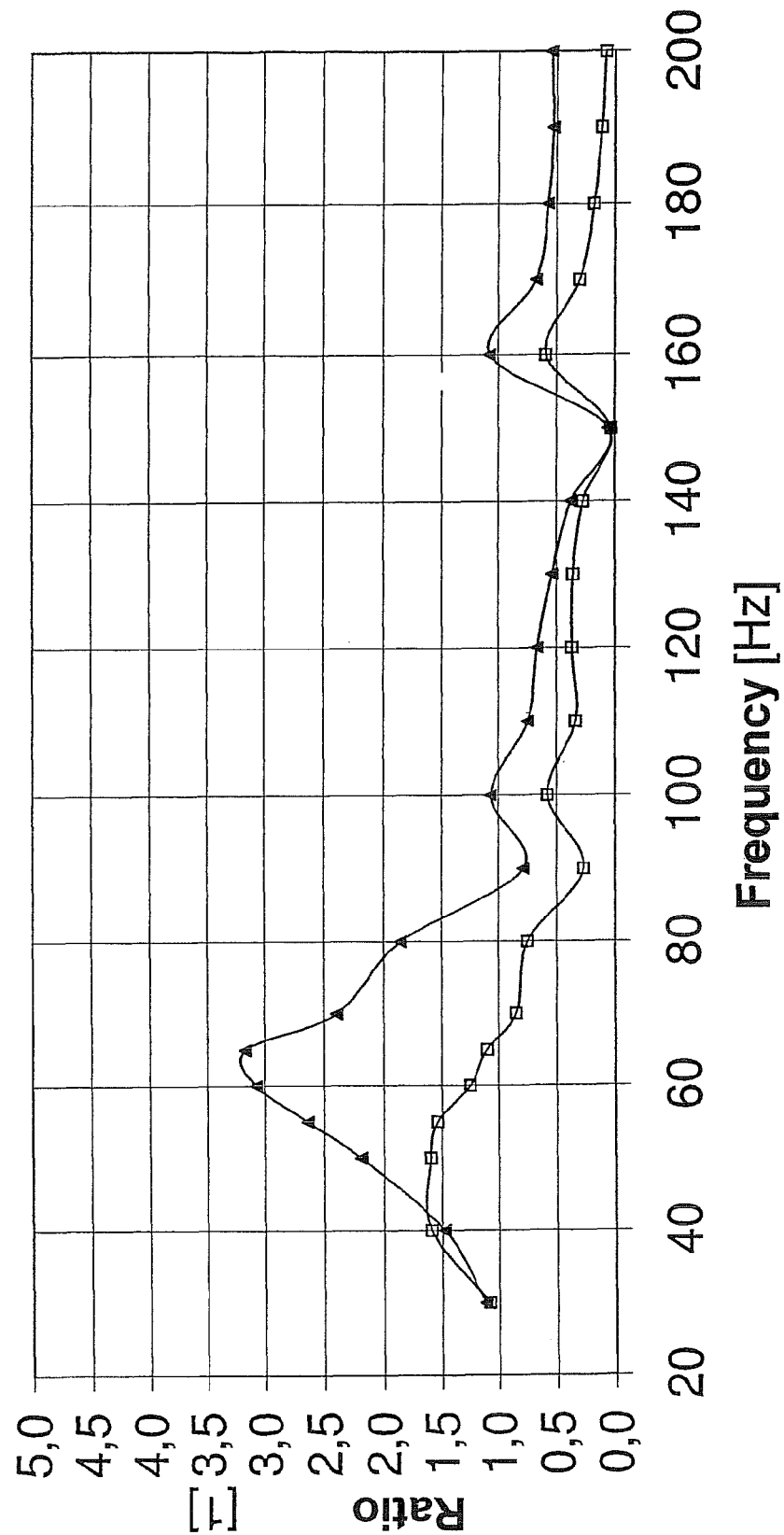
FIG. 10 shows a diagram in which for (1) a hydraulic clutch actuating device without the device according to the invention for reducing pressure pulsations (marked by triangles) and (2) a hydraulic clutch actuating device with a slave cylinder equipped in correspondence with FIG. 1 (marked by blank squares) the ratio of the acceleration measured at a piston rod of the master cylinder to the acceleration measured at a piston rod of the slave cylinder is recorded against frequency, as a result of a test in which a sinusoidal vibration with variable frequency and an amplitude of 1 g (9.81 m/s$^2$) was applied to the piston rod of the slave cylinder.

The vibration-damping characteristics of the afore-described device 70 for reducing pressure pulsations can be readily seen in FIG. 10, which illustrates by way of example the result of tests in which (1) a sinusoidal vibration with variable frequency and an amplitude of 1 g was applied to the piston rod 58 of the slave cylinder 50, (2) the accelerations of the piston rod (not shown) of the master cylinder (not illustrated) hydraulically connected with the slave cylinder 50 and of the piston rod 58 were measured and (3) were, for the test evaluation, recorded in a diagram placed in relationship to one another against excitation frequency. In this regard use was made of a slave cylinder 50 with an effective piston effective diameter of 22.20 mm and a master cylinder with an effective piston effective diameter of 19.05 mm, which were hydraulically interconnected by way of, starting from the slave cylinder 50, (a) an elastomeric coupling hose section (inner diameter: approx. 6 mm; outer diameter: approx. 12 mm; length: approx. 250 mm, one fabric layer) and (b) a metallic coupling pipe section (inner diameter: approx. 4.75 mm; wall thickness: approx. 0.7 mm; length: approx. 610 mm) of an existing pressure line arrangement. The length of the helix section 168 of the channel 72 of the device 70 for reducing pressure pulsations was approximately 200 mm with an open cross-section of approx. 6 mm$^2$. As volume receiving means 78 use was made of a rubber sealing plug in correspondence with FIGS. 8 and 9 with an overall length of approx. 7.3 mm, a maximum outer diameter of approx. 9.6 mm in the region of the sealing bead 198 and an inner diameter of approx. 3 mm in the region of the cylinder section 190.

The vibration-damping capability of the tested device 70 for reduction of pressure pulsations (marked by blank squares) by comparison with the arrangement without a device for reducing pressure pulsations (marked by triangles) is clearly apparent in FIG. 10: a substantial reduction in and displacement of the first maximum (at approx. 65 Hz) towards lower frequencies occurred; in addition, the further vibration maxima are strongly 'depressed', by at least approx. 50%. It is clear to the expert that these results are to be understood as only by way of example and the device 70 for reduction of pressure pulsations can obviously be optimized as desired with respect to its vibration-damping action for the respective installation situation such as in respect of the amplitude behavior or the frequency range to be damped, whether through change in the shape/dimensions of the channel 72 or volume receiver 78 or selection of a different material for the volume receiver 78.

The second and third embodiments shall be described in the following with reference to FIGS. 11 to 16 only to the extent that they differ from the afore-described first embodiment. In these figures the same or corresponding parts were provided with the same reference numerals supplemented by an apostrophe (') for the second embodiment or two apostrophes (") for the third embodiment (not listed in the Reference Numeral List at the end).

Figure 11:
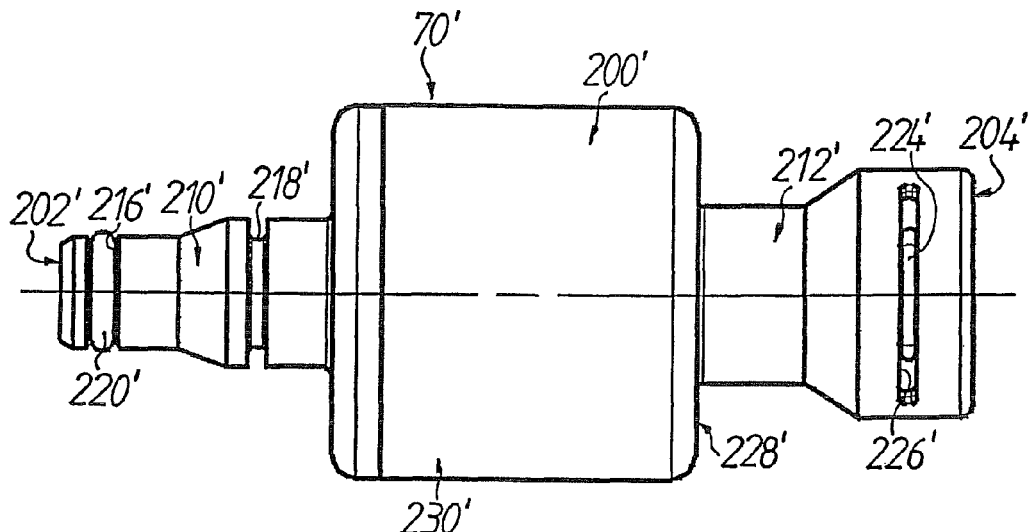
FIG. 11 shows a side view of a device according to the invention for reducing pressure pulsations in accordance with a second embodiment, which has an own housing, i.e. separate from the cylinder housing, but is otherwise similar to the first embodiment.
Figure 12:
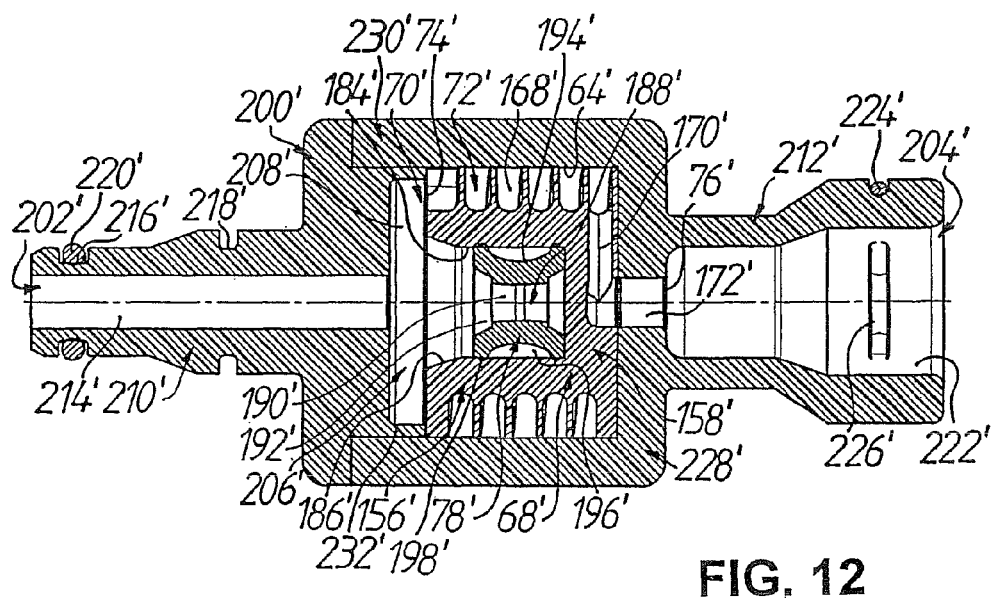
FIG. 12 shows a longitudinal sectional view of the device according to FIG. 11.

The second embodiment illustrated in FIGS. 11 and 12 differs from the first embodiment principally in that the housing for receiving the channel 72' and the volume receiver 78' is a separate housing 200', i.e. a housing separate from the cylinder housing of the slave or master cylinder, which, provided with a slave connection 202' and a master connection 204', is connectible into the hydraulic line (not illustrated) between slave cylinder and master cylinder so that the slave connection 202' and the master connection 204' (the latter by way of the channel 72') communicate with a pressure medium chamber 208' formed in an interior space 206' of the housing 200'. In the illustrated embodiment the separate housing 200' has two parts 210', 212', which are injection-molded from a suitable plastics material and which when fastened to one another bound the interior space 206', in which the modified insert member 68', similarly injection-molded from a suitable plastics material, corresponding with FIG. 12 and the volume receiver 78' according to FIGS. 8 and 9 of the first embodiment are arranged. The latter separates, analogously to the first embodiment, the pressure medium chamber 208' from an annular air chamber 196' in the interior space 206' of the housing 200'.

At the housing part 210' at the left in FIG. 12 the slave connection 202' is executed as a plug part with a plug geometry known per se, comprising a central passage bore 214' for the pressure medium chamber 208' and two axially spaced-apart radial grooves 216', 218', of which the outer radial groove 216' serves for reception of an O-ring 220' for sealing with respect to the (receiving) counter-part (not shown), while the second radial groove 218' in the mounted state of the device 70' receives a securing element (not illustrated), which is fastened to the (receiving) counter-part, of spring steel wire. At the housing part 212' on the right in FIG. 12, thereagainst, the master connection 204' is constructed as a receiving part with a receiving geometry known per se, comprising a recess 222' into which the (plug) counter-part (not shown) is insertable, and a securing element 224' of spring steel wire, which is arranged at the outer circumferential side and which passes through a plug slot 226', which extends transversely to the longitudinal axis of the master connection 204', in order in the mounted state of the device 70' to secure the (plug) counter-part in the recess 222' in a manner known per se.

The righthand housing part 212', which is connected with the master connection 204' at the left in FIG. 12, is of substantially pot-shaped construction, with a base 228' through which the end section 172' of the channel 72' extends in order to ensure a central hydraulic connection between the connecting section 170' in the base 158' of the insert member 68' and the recess 222' of the housing part 212', and a casing section 230', which at the inner circumferential side forms the circumferential wall 64' radially outwardly covering the helix section 168' of the channel 72'. By contrast to the first embodiment, the insert member 68' in the second embodiment does not have at the base 158' any projection for fastening in the housing 200', but instead is axially clamped between the two housing parts 210', 212'. In that case the insert member 68' in FIG. 12 at the right bears by its base 158' over an area against the base 228' of the housing part 212', whilst the insert member 68' is retained on the side at the left in FIG. 12 in the interior space 206' of the housing 200' by means of a projection 232'—which is centrally hollowed in hollow-cylindrical manner and plugged into the casing section 230' of the righthand housing part 212' and which bears against the insert member 68'—of the lefthand housing part 210'. In the region of the projection 232' the two housing parts 210', 212', which here tightly engage one in the other, are preferably glued together or ultrasonically welded together; alternatively thereto, however, a screw connection could also be provided.

As already mentioned in the introduction, the thus-constructed device 70' for reducing pressure pulsations can be arranged largely freely in the hydraulic line between slave cylinder and master cylinder, for example between a hose section, which is at the slave cylinder side, and a pipe section which is at the master cylinder side, of the hydraulic line. The function or manner of effect of the device 70' in this regard corresponds with that of the device 70 according to the first embodiment.

Figure 13:
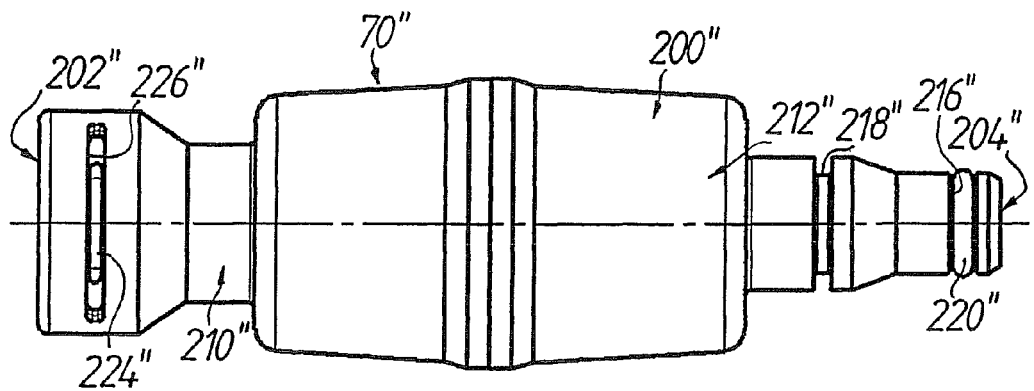
FIG. 13 shows a side view of a device according to the invention for reducing pressure pulsations in accordance with a third embodiment, which similarly has an own housing, i.e. separate from the cylinder housing, but differs from the second embodiment with respect to the construction and physical arrangement of the additional conduit and volume receiver.
Figure 14:
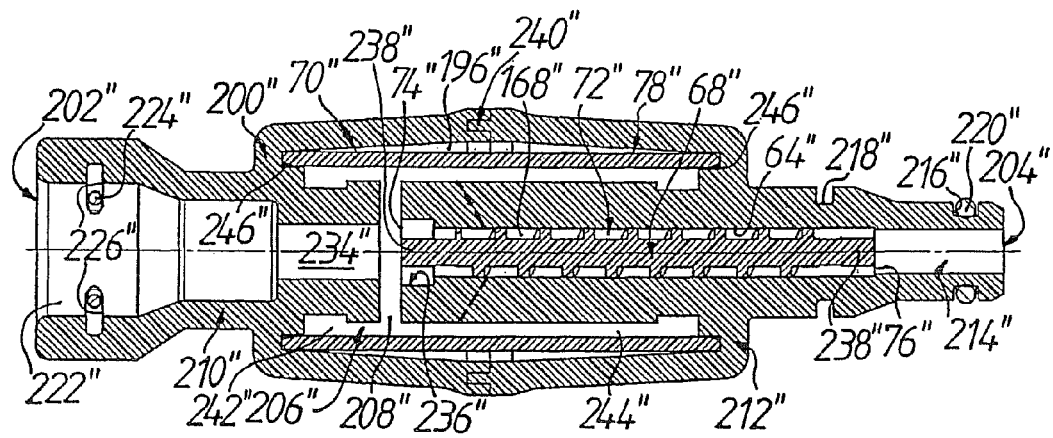
FIG. 14 shows a longitudinal sectional view of the device according to FIG. 13.
Figure 15:
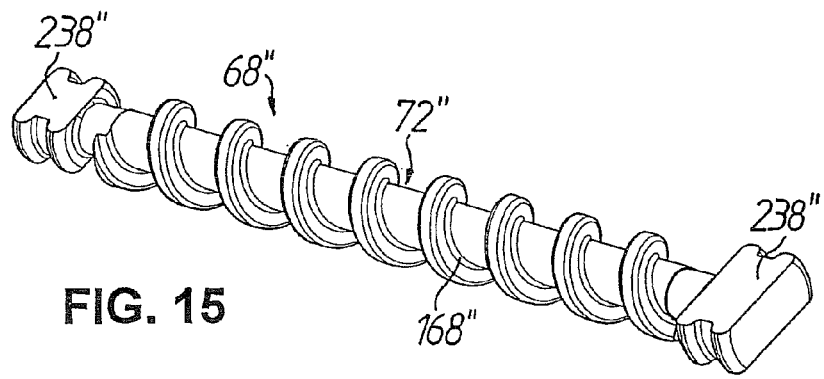
FIG. 15 shows a perspective individual illustration, obliquely from the front, of a pin-shaped insert member inserted into the device according to FIGS. 13 and 14, particularly for illustration of a groove helically extending at the outer circumference of the insert part and forming a helix section of a channel, which is provided as an additional conduit of the device.

In the case of the third embodiment illustrated in FIGS. 13 to 15 firstly the slave connection 202" and the master connection 204" of the two-part housing 200" are constructed differently from the case of the second embodiment, namely mutually reversed so that the slave connection 202" is formed as receiving part whilst the slave connection 204" is constructed as plug part. In this regard the recess 222" of the slave connection 202" is in fluid connection with the pressure medium chamber 208" via a passage 234" in the housing part 210" at the left in FIG. 14.

The central passage bore 214", which communicates with the pressure medium chamber 208" by way of the channel 72", thereagainst has in the housing part 212" on the right in FIG. 14 a stepped bore section 236" into which the substantially pin-shaped insert member 68" is inserted. As a result, the helix section 168"—which again is formed at the outer circumference of the insert member 68" as a groove in accordance with, in particular, FIG. 15—of the channel 72" is covered radially outwardly by an inner circumferential surface 64" of the bore section 236" of the housing 200". The ends 238" of the insert member 68" injection-molded from a suitable plastics material are respectively planoparallelly flattened in order to ensure a free passage to the pressure medium chamber 208" or to the end, at the right in FIG. 14, of the passage bore 214". The insert member 68" can, for example, be dimensioned/matched in, for example, outer diameter with respect to the inner diameter at the circumferential wall 64" in such a manner that it is fixed by pressing into the passage bore 214". Transverse bores with very small cross-section can be provided (indicated in FIG. 14 by dashed lines) in order to ensure better ventilation of the channel 72" with respect to the pressure medium channel 208" particularly in the case of filling of the device 70" with hydraulic fluid. In the case of this embodiment as well, the helix section 168" of the channel 72" has a cross-section— here substantially rectangular—smaller than the minimum free cross-section of the master connection 204" (in the end of the passage bore 214" at the right in FIG. 14).

According to FIG. 14 the two housing parts 210", 212" are additionally provided at 240" with annular structures of complementary construction, which mechanically positively interengage and at which the two housing parts 210", 212" are welded or glued for formation of the housing 200'. The righthand housing part 210" and the lefthand housing part 212" are formed with an annular recess 242" and 244", respectively, which together receive the volume receiver 78" so that the volume receiver 78" is clamped between the two housing parts 210", 212".

The volume receiver 78" itself is a tubular element of a resilient plastics material, for example injection-molded polyamide 66 without glass-fiber reinforcement, which separates the radially inner pressure medium chamber 208" from the radially outer air chamber 196" in the somewhat spherically formed housing 200". O-rings 246" at the end and between the volume receiver 78" and the respective housing part 210", 212" in that regard seal the pressure medium chamber 208" relative to the air chamber 196". In the case of this embodiment as well the helix section 168" of the channel 72" and the volume receiver 78" in the housing 200" are arranged in a mutual coaxial positional relationship with one substantially surrounding the other, so that the housing 200" is of relative short construction, but here designed so that the volume receiver 78" at least partly coaxially surrounds the helix section 168" of the channel 72".

It will be apparent to the expert that the volume take-up of a volume receiver 78" designed in that manner can easily be appropriately matched to the respective installation and functional requirements by suitable selection of the parameters of material, wall thickness, diameter and/or length of the hollow-cylindrical pipe section so as to take into account, for example, the respective operating pressure of an actuating path. The function or manner of effect of the device 70" overall was already explained in more detail in the introduction so that further explanations with respect thereto at this point appear superfluous.

Figure 16:
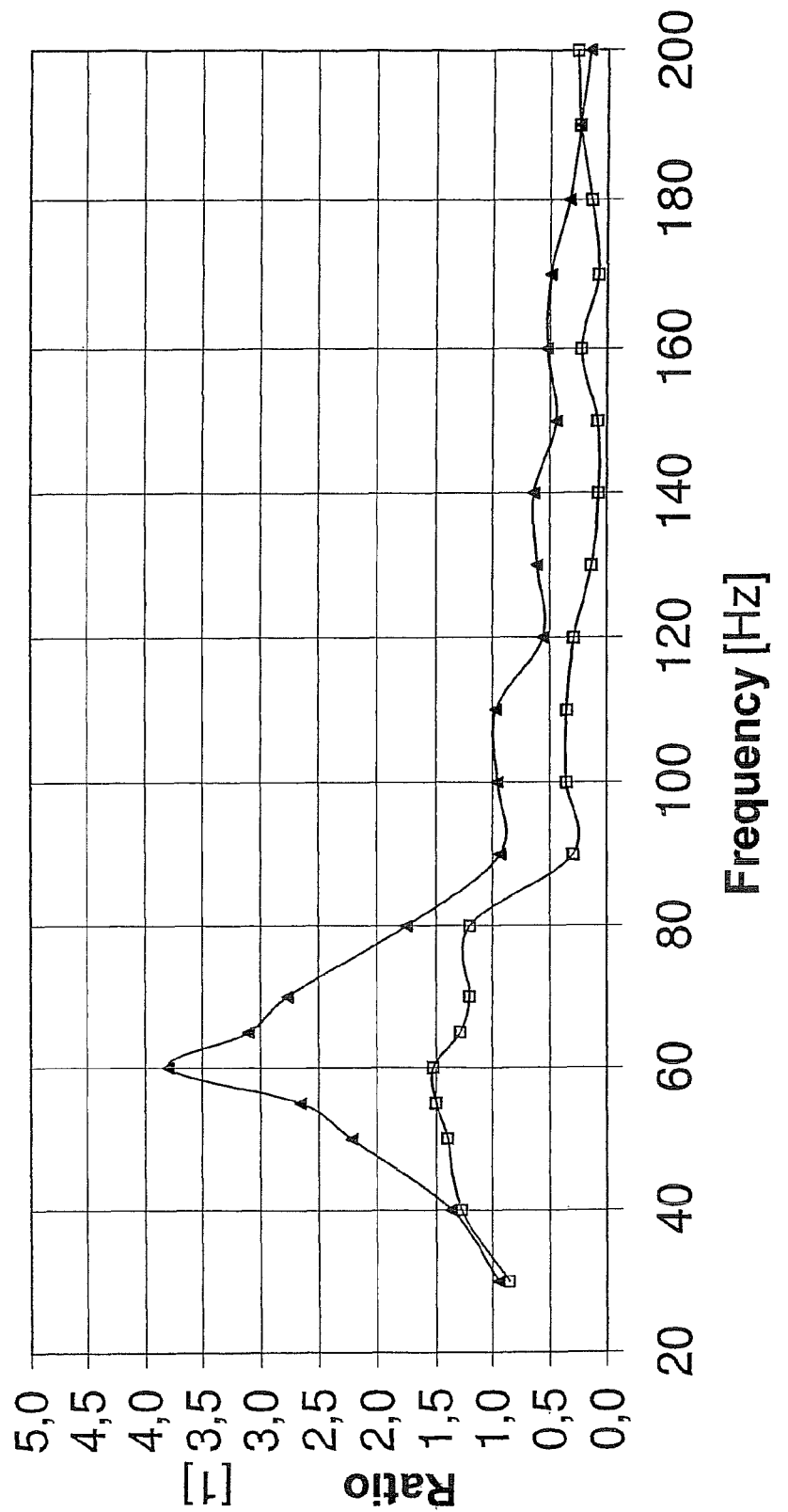
FIG. 16 shows a diagram analogous to that of FIG. 10 in which for (1) a hydraulic clutch actuating in device without a device according to the invention for reducing pressure pulsations (marked by triangles) and (2) a hydraulic clutch actuating means device into which a device corresponding with FIGS. 13 to 15 is connected into the hydraulic line between master cylinder and slave cylinder (marked by blank squares), the ratio of the acceleration measured at a piston rod of the master cylinder to the acceleration measured at a piston rod of the slave cylinder is recorded against frequency, as the result of a test in which a sinusoidal vibration at a variable frequency and an amplitude of 1 g (9.81 m/s$^2$) was applied to the piston rod of the slave cylinder.

Tests were also carried out with respect to the third embodiment, the result of which is illustrated in FIG. 16 by way of example. The actual performance of the test corresponded with that which was already described further above with reference to FIG. 10. However, in the present case use was made of a slave cylinder with an effective piston effective diameter of 19.05 mm and a master cylinder with an effective piston effective diameter of 15.87 mm, which—analogously to FIG. 23—were hydraulically connected together by way of, starting from the slave cylinder, (a) a metallic clutch pipe section (inner diameter: approx. 4.75 mm; wall thickness: approx. 0.7 mm; length: approx. 300 mm), (b) an elastomeric clutch hose section (inner diameter: approx. 6 mm; outer diameter: approx. 12 mm; length: approx. 250 mm, one fabric layer) and (c) a metallic clutch pipe section (inner diameter: approx. 6 mm, wall thickness: approx. 0.7 mm; length: approx. 400 mm) of an existing pressure line arrangement. The (developed) length of the helix section 168" of the channel 72" of the device 70" for reducing pressure pulsations, which was arranged between the clutch hose section and the clutch pipe section at the master cylinder side, again amounted to approx. 200 mm, with a free cross-section of approx. 3.6 mm². As volume receiver 78" use was made of a pipe section of an unreinforced polyamide 66 with an overall length of approx. 40 mm, an outer diameter of approx. 18 mm and an inner diameter of approx. 15.4 mm.

The vibration damping capability of the tested device 70" for reducing pressure pulsations (marked by blank squares) by comparison with the arrangement without a device for reduction of pressure pulsations (marked by triangles) is clearly evident from FIG. 16: there is a substantial reduction particularly of the first maximum (at approx. 60 Hz), but without displacement in the frequency range. It is also to be noted that these results are to be understood as only by way of example: the device 70" for reducing pressure pulsations can be optimized as desired with respect to its vibration-damping effect for the respective installation situation such as in respect of the amplitude behavior or the frequency range to be damped, whether by changing the shape/dimensions of channel 72" or volume receiver 78" and/or the selection of a different material for the volume receiver 78".

Figure 17:
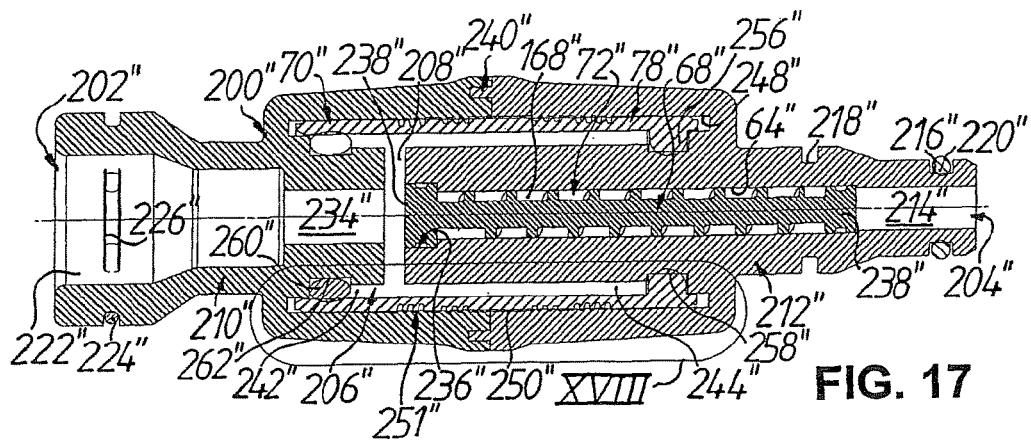
FIG. 17 shows a longitudinal sectional view of a device according to the invention for reducing pressure pulsations in accordance with a variant of the third embodiment, in which—by comparison with FIG. 14—in particular the volume receiver is of different construction.
Figure 18:
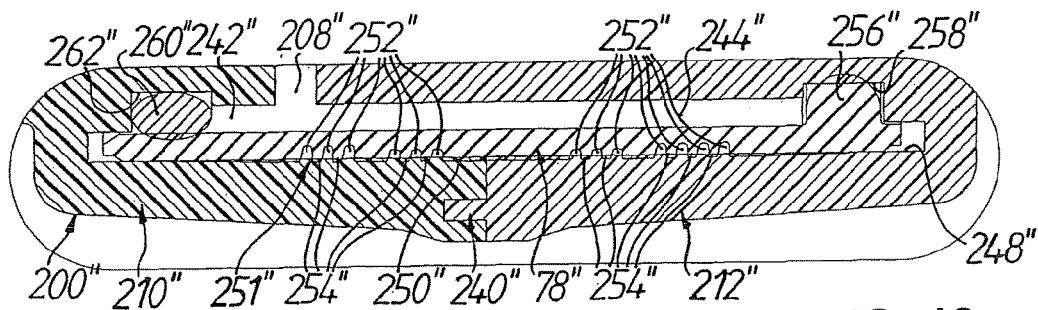
FIG. 18 shows an illustration, to enlarged scale, of the detail XVIII in FIG. 17.

FIGS. 17 and 18 show a variant of the third embodiment according to FIGS. 13 to 15, which will be described in the following only to the extent that it differs from the third embodiment.

In the first instance, in FIG. 17—by comparison with FIG. 14—the insert member 68" is turned through 90° about its longitudinal axis so that the free passages to the pressure medium chamber 208" or to the passage bore 214" are not visible. Moreover, the housing 200" is not of spherical construction in correspondence with FIG. 14, but such that the inner circumferential surface 248", which is formed by the housing parts 210", 212" and surrounds the volume receiver 78", of the housing 200" is substantially cylindrical.

Moreover, an air chamber corresponding with FIG. 14 (there reference number 196") is not present between the outer circumferential surface 250" of the volume receiver 78", which for simplification of the illustration is shown in undeformed state, and the inner circumferential surface 248" of the housing 200". Instead, the volume receiver 78" bears by its outer circumferential surface 250" against the inner circumferential surface 248" of the housing 200". For that purpose, the substantially hose-shaped volume receiver 78", made from a rubber-elastic material such as EPDM (elastomer on the basis ethylene-propylene-diene rubber), is profiled (profiling 251") at its outer circumferential surface 250" so that it does not bear over the whole area against the inner circumferential surface 248" of the housing 200", but only so as to leave comparatively small cavities. In the illustrated embodiment (see FIG. 18) these cavities are formed by a plurality of annular grooves 252" which are separated from one another by encircling webs 254". As a consequence of this design, the volume receiver 78" can, in the case of pressure loading by the housing 200", more specifically the inner circumferential surface 248" thereof, be compressed, with comparatively small volume take-up in the pressure medium chamber 208. Through suitable selection of the geometry—groove or grooves with rounded or polygonal cross-section, other recesses serving to leave nubs, etc. —and/or the dimensions—depth, width and/or number of grooves or recesses, etc. —of the profiling 251', the volume take-up of the device 70" can be limited in defined manner in correspondence with the respective use requirements and the damping characteristics of the device 70" influenced.

As can, moreover, be seen particularly in FIG. 18, the pressure medium chamber 208" is sealed between the ends of the volume receiver 78" and the housing 200". More precisely in the illustrated embodiment the volume receiver 78" is integrally formed at its end, which is at the right in FIG. 18, at the inner circumferential side with a sealing bead 256" which is received in an associated annular groove 258" of the housing part 212". Thereagainst, at the end, which is at the left in FIG. 18, of the volume receiver 78" there is provided an O-ring 260" which bears against the substantially cylindrical inner circumference of the volume receiver 78" and is in turn received in an associated annular groove 262" of the housing part 210". In principle, however, also both ends of the volume receiver can be provided at the inner circumference with a respective sealing bead or be provided at both ends of the volume receiver at the inner circumference with a respective O-ring.

Figure 19:
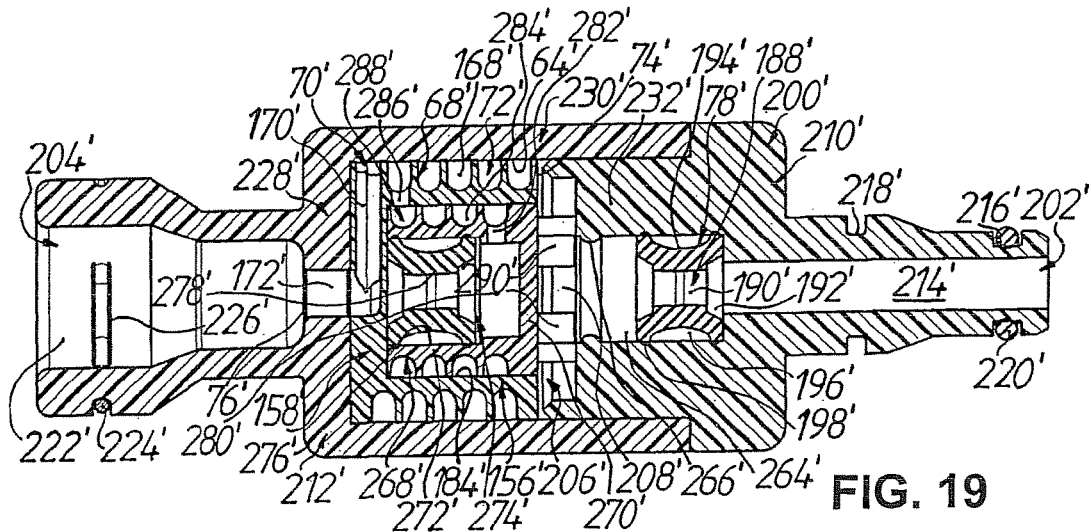
FIG. 19 shows a longitudinal section view of a device according to the invention for reducing pressure pulsations in accordance with a variant of the second embodiment, which differs from FIG. 12 particularly in the respect that a further path section branches off the additional conduit and opens into a closed chamber in which a second volume receiver can be arranged.

FIG. 19 shows a device variant with respect to the second embodiment according to FIGS. 11 and 12, such as can in principle also be used in the first embodiment according to FIGS. 1 to 10 and which in the following will be described only to the extent that it differs from the afore-described embodiments.

According to FIG. 19 the housing parts 210', 212' of the housing 200' are firstly formed to be axially prolonged by comparison with FIGS. 11 and 12 so as to create space in the housing part 210' for a receiving space 264', which is connected with the passage bore 214' and has a larger diameter by comparison therewith, for reception of the volume receiver 78'. The receiving space 264' is terminated in FIG. 19 at the left by a radially inwardly protruding annular bead 266' which ensures that the volume receiving member 78' cannot, in operation, migrate out of the receiving space 264'.

Moreover, inserted into the insert member 68' arranged in the housing part 212' is a substantially pot-shaped inner insert 268' with a closed base 270', which faces the housing part 210', and a casing section 272' bearing at the end against the base 158' of the insert member 68'. The base 270' and the casing section 272' of the inner insert 268' bound together with the base 158' of the insert part 68' a closed chamber 274' having a single step in diameter. An additional volume receiver 278' can be provided, as illustrated, in the larger diameter chamber section 276' of the chamber 274' in addition to the afore-described volume receiver 278'. However, alternatively thereto also only the volume receiver 78' can be provided in the receiving space 264', while no volume receiver is arranged in the chamber 274', or the volume receiver 278' can be provided in the chamber 274' instead of the volume receiver 78' in the receiving chamber 264'.

The smaller-diameter chamber section 280' of the chamber 274' is disposed in fluid connection by way of a connecting bore 282' with a helix section 284' which is formed at the outer circumference of the inner insert 268', more precisely the casing section 272' thereof, analogously to the helix section 168', which is at the outer circumference, of the insert member 68'. The helix section 284' is in turn hydraulically connected by way of a further connecting bore 286' with the helix section 168' of the insert member 68'. As a result, the connecting bore 286' in the insert member 68', the helix section 284' formed between insert member 68' and inner insert 268' and the connecting bore 282' in the inner insert 268' form a further path section 288', which branches off the additional conduit or the channel 72', of the device 70' for reducing pressure pulsations, which path section has a length which is a multiple of the direct spacing between the connecting bores 282' and 286' and which path section opens in the manner of a dead end in the closed chamber 274' with or without volume receiver 278'. This represents a further possibility of appropriately adapting the device 70' with respect to its damping characteristics to the respective use requirements.

It remains to be mentioned with respect to this variant that the inner insert 286' is held in the insert member 68' with the help of annularly segmental webs 290' which in integral construction with the housing part 210' or the inner insert 268' and distributed uniformly over the circumference follow the annular bead 266' on the left in FIG. 19.

FIGS. 20 to 22 finally show two variants similar to the first embodiment which was described above with reference to FIGS. 1 to 10 and which will be described in the following only to the extent that they differ from the first embodiment.

It is common to these variants that the device 70 for reducing pressure pulsations is again integrated in the cylinder housing 52 of the slave cylinder 50; however this time it is not in the pressure chamber 60, but in a pressure connection section 292, which is physically separate or spaced from the pressure chamber 60, of the cylinder housing 52, which in the illustrated variants extends, starting from the housing base 62 of the cylinder housing 52, away from the housing base 62 at approx. 40° to the housing longitudinal axis.

In this regard, the pressure connecting section 292 is provided, starting from its upper end at the right in FIGS. 20 and 22, with a stepped bore 294 which ultimately opens into the pressure connecting bore 130 of the pressure connection 66 to the pressure chamber 60. More precisely, the stepped bore 294, starting from the pressure connecting bore 130, has a plurality of bore sections with increasing diameter from section to section, namely:

a. a connecting section 296 to the pressure connecting bore 130, b. a first receiving section 298 for reception of the volume receiver 78 (cf., for details of the latter, FIGS. 8 and 9 with associated description) and a tubular projection 300 of the insert member 68, c. a second, optionally again slightly stepped (see FIG. 22), second receiving section 302 for the main part of the insert member 68 and a plug end or plug section 304 of a connecting member 306, which retains the insert member 68 in the pressure connecting section 292, d. a fastening section 308 for fastening the connecting member 306 in the pressure connecting section 292, provided—in FIG. 20—with an internal thread which co-operates with an external thread 310 at the connecting member 306; in FIG. 22, thereagainst, provided with an annular groove 312 into which a slotted plastics material ring 314 is inserted for formation of a snap connection with an associated annular groove 315 in the connection member 306, and e. optionally a joining chamfer 316 (see FIG. 20) for the connecting member 306.

The connecting member 306 itself has, analogously to the second embodiment described in the foregoing with reference to, in particular, FIG. 12, a master connection 204 with receiving geometry known per se, having the recess 222 ending at the opening 76 of the channel 72 at the master cylinder side, the securing element 224 and the insertion slot 226 for that purpose. In addition, the plug end or plug section 304 is provided with an annular groove for reception of an O-ring 318 which seals relative to the second receiving section 302 of the stepped bore 294.

The insert member 68 bearing against the annular shoulder 320 formed between the first receiving section 298 and the second receiving section 302 of the stepped bore 294 similarly has at the outer circumference of the projection 300 an annular groove 322 (cf. FIG. 21) in which a further O-ring 324 is received, which seals relative to the first receiving section 298 of the stepped bore 294. Finally, the insert member 68, starting from the free end of the projection 300, is provided with a blind bore 326 which as a component of the channel 72 forms at one end thereof the opening 74 at the slave cylinder side and at the other end thereof is hydraulically connected with the helix section 168 of the insert member 68 by way of a connecting bore 328 to be regarded as similar to the channel 72 and extending transversely to the insert member 68.

The helix section 168 of the insert member 68 additionally has, in this variant according to FIG. 21, the feature that at 330 it possesses a helix reversal having the effect that the hydraulic fluid, which on actuation of the hydraulic clutch actuating means comes from the opening 76 at the master cylinder side and which initially flows with respect to the longitudinal axis of the insert member 68 in clockwise sense through the helix section 168 of the channel 72, changes its direction of movement at the helix reversal 330, which is formed in the manner of a switchback turn, and flows from the helix reversal 330 through the helix section 168 in counter-clockwise sense. In other words, the helix reversal 330 divides the helix section 168 into a subsection 332 running in the manner of a righthand thread and a subsection 334 running in the manner of a lefthand thread. As a result, by comparison with the helix section without helix reversal, on the one hand a slightly larger throughflow resistance increasing the damping effect of the device 70 arises and on the other hand the axial space requirement of the thus-formed helix section 168 is smaller. A helix reversal of that kind can obviously also be provided in the other embodiments.

Otherwise, the variants according to FIGS. 20 and 22 additionally differ—apart from the different material for the cylinder housing 52 (light metal in FIG. 20; plastics material in FIG. 22)—in that in the case of the variant according to FIG. 22 the insert member 68 and the connection member 306 are of integral construction, preferably by means of injection molding from plastics material.

A device, which is connectible between a pressure chamber of a slave cylinder and a pressure chamber of a master cylinder of a hydraulic force transmission system, particularly a hydraulic clutch actuating means for motor vehicles, and which is constantly open to the pressure medium, for reducing pressure pulsations is disclosed. This device comprises an additional conduit in the form of a channel, which has a helix section, an opening at the slave cylinder side, an opening at the master cylinder side and a channel length which is a multiple of the direct spacing between the two openings, and a volume receiver which is resiliently deformable under pressure, wherein the channel and the volume receiver are combined in a housing to form a subassembly in such a way that the helix section, which extends in the manner of a screw thread, and the volume receiver are arranged in the housing in a mutually coaxial positional relationship surrounding the other. As a result, a device is created which not only has very good vibration damping characteristics, but is also constructed very compactly and has an economic construction.

The invention claimed is:

1. A device for reducing pressure pulsations being connectible between a pressure chamber of a slave cylinder and a pressure chamber of a master cylinder of a hydraulic force transmission system, for motor vehicles, and constantly open to the pressure medium, said device comprising:
a channel having a helix section defining an opening at the slave cylinder side and an opening at the master cylinder side, and having a channel length equal to a multiple of the direct spacing of the two openings,
a one-piece volume receiver which is comprised of a material resiliently deformable under pressure,
characterized in that the channel and the volume receiver are combined in a housing in such a way that the helix section, and the volume receiver are arranged in the housing in a mutually coaxial positional relationship with one substantially surrounding the other wherein the volume receiver separates a pressure medium section from an air chamber and is arranged in a blind bore which forms a dead end so that the pressure medium does not flow through the volume receiver; and
the helix section of the channel is formed at an outer circumference of an insert member as a groove that radially extends about a common wall with the blind bore, the groove being covered radially outwardly by an inner circumferential surface of the housing.

2. A device according to claim 1, characterized in that the volume receiver is hydraulically connected upstream of the channel as seen in a direction from the slave cylinder to the master cylinder.

3. A device according to claim 2, characterized in that said insert member at least partly together with the housing bounds the channel when inserted into the housing.

4. A device according to claim 3, characterized in that the insert member is of substantially pot-shaped construction with a casing section and a base.

5. A device according to claim 4, characterized in that the helix section of the channel formed at the outer circumference of the casing section of the insert member communicates with the opening of the channel at the master cylinder side by way of a connecting section of the channel extending in the base of the insert member.

6. A device according to claim 5, characterized in that the volume receiver is mounted at the inner circumference of the casing section of the insert member.

7. A device according to claim 6, characterized in that the volume receiver is a rubber-elastic bobbin-shaped element with a passage bore and at the outer circumferential side an annular recess bounding together with the inner circumference of the casing section of the insert member forms said air chamber that is annular in shape.

8. A device according to claim 3, characterized in that the insert member and the housing are injection-molded at least partly from a plastics material.

9. A device according to claim 1, characterized in that the helix section has a helix reversal dividing the helix section into a subsection extending in righthanded direction and a subsection extending in lefthanded direction.

10. A device according to claim 1, characterized in that an insert member at least partly together with the housing bounds the channel when inserted into the housing.

11. A device according to claim 4, characterized in that the volume receiver is mounted at the inner circumference of the casing section of the insert member.

12. A device according to claim 1, characterized in that the housing is a separate housing provided with a slave connection and a master connection and connectible into a hydraulic line between slave cylinder and master cylinder so that the slave connection and the master connection communicate with the pressure medium chamber formed in the interior space of the housing.

13. A device according to claim 3, characterized in that the housing is a separate housing having two parts which when fastened to one another bound the interior space in which the insert member and the volume receiver are arranged.

14. A device according to claim 1, characterized in that the housing is a cylinder housing of one of the slave cylinder and the master cylinder and has a pressure connection.

15. A device according to claim 1 wherein the helix section comprises a single helical channel between said openings at the slave cylinder side and an opening at the master cylinder side.

* * * * *

UNITED STATES PATENT AND TRADEMARK OFFICE
CERTIFICATE OF CORRECTION

| | |
|---|---|
| PATENT NO. | : 9,605,718 B2 |
| APPLICATION NO. | : 13/145408 |
| DATED | : March 28, 2017 |
| INVENTOR(S) | : Gerbert et al. |

It is certified that error appears in the above-identified patent and that said Letters Patent is hereby corrected as shown below:

In the Specification

Column 7, Line 50, after "actuating" delete "in"
Column 7, Line 53, after "actuating" delete "means"
Column 8, Line 18, after "similar to" delete "of"
Column 12, Line 25, delete "foimed" and insert --formed-- therefor
Column 23, Line 13, after "relationship" insert --with one substantially--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*